(12) United States Patent
Sun

(10) Patent No.: US 9,800,627 B2
(45) Date of Patent: Oct. 24, 2017

(54) METHOD, DEVICE AND SYSTEM FOR SHARING PLAYED CONTENT OF APPLICATION

(71) Applicant: Tencent Technology (Shenzhen) Company Limited, Shenzhen, Guangdong (CN)

(72) Inventor: Wei Sun, Shenzhen Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 272 days.

(21) Appl. No.: 14/206,732

(22) Filed: Mar. 12, 2014

(65) Prior Publication Data

US 2014/0195616 A1 Jul. 10, 2014

Related U.S. Application Data

(63) Continuation of application No. PCT/CN2012/087008, filed on Dec. 20, 2012.

(30) Foreign Application Priority Data

Dec. 20, 2011 (CN) .......................... 2011 1 0429067

(51) Int. Cl.
G06F 15/16 (2006.01)
H04L 29/06 (2006.01)

(52) U.S. Cl.
CPC ........ *H04L 65/403* (2013.01); *H04L 65/4015* (2013.01)

(58) Field of Classification Search
CPC ....... H04L 65/403; H04L 67/22; G06F 15/16; G06F 17/30165

(Continued)

(56) References Cited

U.S. PATENT DOCUMENTS 8,346,868 B2 * 1/2013 Nakajima ............... H04L 29/06
709/203
8,782,170 B2 * 7/2014 Kikkawa ............ H04N 7/17336
709/219

(Continued)

FOREIGN PATENT DOCUMENTS

| CN | 101072359 | 11/2007 |
|----|-----------|---------|
| CN | 101201253 | 6/2008 |
| CN | 102025759 | 4/2011 |

OTHER PUBLICATIONS

International Search Report with English translation, dated Mar. 21, 2013, pp. 1-4, International Patent Application No. PCT/CN2012/087008, State Intellectual Property Office of the PRC, Beijing, China.

*Primary Examiner* — Tesfay Yohannes
(74) *Attorney, Agent, or Firm* — Brinks Gilson & Lione

(57) ABSTRACT

A method, a device and a system for sharing content being played by an application are provided. To share the content, the application may generate content position information of the content being currently played. An application platform system may generate a position information address according to the content position information, and further may form a sharing address by combining the position information address with an access address of the shared content. The sharing address may be published through a sharing channel. If and when a receiver clicks the sharing address, an application platform system of the receiver may extract the content position information therefrom. The content position information may be sent to an application of the local application platform system for parsing. The local application program may play, according to the parsed content position information, the shared content provided by the access address.

16 Claims, 10 Drawing Sheets

(58) Field of Classification Search
USPC .......................... 709/204, 206, 229; 726/28
See application file for complete search history.

(56) References Cited

U.S. PATENT DOCUMENTS

| | | | |
|---|---|---|---|
| 2008/0133678 A1* | 6/2008 | Woodham | H04L 51/066 709/206 |
| 2008/0134040 A1* | 6/2008 | Pennington | G06F 17/3089 715/733 |
| 2008/0207233 A1* | 8/2008 | Waytena | G06F 17/30864 455/466 |
| 2009/0151006 A1* | 6/2009 | Saeki | G06F 21/10 726/28 |
| 2009/0157829 A1* | 6/2009 | Choi | G06Q 10/107 709/206 |
| 2009/0265480 A1* | 10/2009 | Verdot | G06F 17/30038 709/245 |
| 2010/0146376 A1* | 6/2010 | Reams | G06Q 30/02 715/208 |
| 2011/0055314 A1* | 3/2011 | Rosenstein | G06F 17/30899 709/203 |
| 2012/0054355 A1* | 3/2012 | Arrasvuori | G06Q 10/10 709/229 |
| 2012/0184349 A1* | 7/2012 | Barclay | G07F 17/3204 463/20 |

* cited by examiner

METHOD, DEVICE AND SYSTEM FOR SHARING PLAYED CONTENT OF APPLICATION

This application is a continuation application of International Application No. PCT/CN2012/087008, titled "Method, device and system for sharing played content of application", filed on Dec. 20, 2012, which claims priority to Chinese patent application No. 201110429067.3 titled "Method, device and system for sharing played content of application" and filed with the State Intellectual Property Office on Dec. 20, 2011, which is incorporated herein by reference in its entirety.

FIELD OF THE DISCLOSURE

The present disclosure relates to the field of network communication, and in particular to a method, device and system for sharing content played by an application program.

BACKGROUND

With continuous improvement in the processing capabilities of a smart data terminal, the number of application programs (APPs) which may be operated by a smart data terminal is continually increasing.

An application program may be a third party application program. An application platform system may be a platform system which is able to operate the third party application program. The application platform system may operate in a local terminal. Alternatively, the application platform system may operate on a network, for example on a server, and a user may log into the application platform system from a network enabled terminal. The terminal may connect to the application platform system via the internet. The user may operate the application program in the application platform system after logging into the application platform system.

The user may share the application program with another user in the application platform system. The application program may have a unique identification. The application platform system may send the unique identification of the shared application program to a second user, viz. a recipient of the shared application program, via a sharing channel of the application platform system. The sharing channel may be, for example, an instant communication system, a mail system, a short message system, a blog system, a microblog system, a web log system and a network space system based on the application platform system. The unique identification may be sent after receiving an instruction for sharing the application program. An application platform system of the recipient may find the shared application program by using the unique identification of the shared application program, and open and operate the shared application program. Thus, the application program may be shared with the second user in the application platform system.

Further, content played by the application program may be shared with the second user. The played content may be embedded into the application program to make up an application program containing the content. Such application programs may be referred to as a content application program, such as a video file application program, an audio file application program, and an e-book application program. A video player may be integrated into the video file application program to directly play the video content in the application program. An audio player may be integrated into the audio file application program to directly play the audio content in the application program. A reader may be integrated into the e-book application program to directly show contents in the e-book. If the user shares this kind of content application program in the application platform system, the content played by the application program may also be shared.

In addition, An access address of the played content of the application program may be shared with the second user via the sharing channel of the application platform system. The second user (i.e., the recipient) may select a corresponding application program to access the access address of the shared played content, thereby accomplishing the sharing of the played content.

However, the above examples have the following disadvantage. The recipient may only play all of the shared played content from beginning, such as play a video from beginning, play an audio from beginning, play an e-book from beginning, and not play the shared played content from a particular position. That is to say, when the recipient may play the shared played content, the recipient may not be able to position the playing position (for example, by a playing progress bar) of the played content when the sharer shares the played content.

SUMMARY OF THE INVENTION

In view of the above, the present disclosure provides a method for sharing content played by an application program as well as a related sharing system and a related application platform system, so as to achieve the position sharing and positional playing of the content played by the application program.

The technical solution of the present disclosure is as follows.

A method for sharing content played by an application program may include at least the following steps.

A: Generating, by an application program in an application platform system of a sharer, content position information of content currently being played, in response to receipt of a sharing instruction. The application program may be playing the content when the instruction is received. The application program may send the content position information of the content currently being played, to the application platform system of the sharer.

B: Generating a sharing address according to the content position information and publishing the sharing address, by the application platform system of the sharer.

C: Transforming, by an application platform system of a recipient, a position information address in the sharing address into the content position information upon receipt of triggering for the sharing address. Further, the application platform system of the recipient, may initiate an application program to parse the content position information, to positioning play the content corresponding to an access address in the sharing address.

In another aspect, a system for sharing content played by an application program may include an application platform system and a sharing interface and a positioning playing interface in the application program. The application program may operate in the application platform system.

The sharing interface in the application program may generate content position information of content currently being played upon receipt of a sharing instruction while the application program may play the content. The sharing interface may also send the content position information of the content currently being played to a local application platform system.

The application platform system may also include a sharing triggering module, a sharing publishing module and a sharing receiving module.

The sharing triggering module may receive a sharing instruction to share the content played by the application program. The sharing triggering module may also notify the sharing interface in the application program of receipt of the sharing instruction. The sharing triggering module may also be responsible to receive the content position information returned by the sharing interface.

The sharing publishing module may generate a sharing address according to the content position information and publish the sharing address.

The sharing receiving module may transform a position information address in the sharing address into the content position information upon receipt of the triggering for the sharing address. The sharing receiving module, may in turn, trigger the application program to send the content position information or send the content position information and an access address of the shared content in the sharing address to the positioning playing interface in the application program.

The positioning playing interface in the application program may receive the content position information. Alternatively, the positioning playing interface may receive the content position information and the access address of the shared content sent by the application platform system. The positioning playing interface may parse the content position information to positioning play the shared content.

An application platform system may include a sharing triggering module, a sharing publishing module and a sharing receiving module.

The sharing triggering module may receive a sharing instruction for the content being played by the application program. The sharing triggering module may also notify to the application program that the sharing instruction has been received. The sharing triggering module may also receive the content position information returned by the application program.

The sharing publishing module may generate a sharing address according to the content position information and publish the sharing address.

The sharing receiving module may transform a position information address in the sharing address into the content position information upon receipt of the triggering for the sharing address. The sharing receiving module may, in turn, trigger the application program to send the content position information or the content position information and an access address of the shared content in the sharing address to the application program.

Thus, when the sharer shares the played content with the recipient, a playing position (namely, a playing progress), may be recorded by using the content position information. The content position information may be shared along with the access address of the shared content, so as to achieve the positioning sharing of the content played by the application program. An application program in an application platform system of the recipient may positioning play the shared content according to the content position information, thereby achieving the positioning playing of the shared content.

The object of the present disclosure is also to provide a method for sharing content played by an application program as well as a related sharing system, a related application platform system and a related sharing reading device, so as to achieve the positioning sharing and positioning playing of the content played by the application program.

A technical solution of such a technical problem is as follows.

A method for sharing content played by an application program may include at least the following steps.

A: Generating, by an application program in an application platform system of a sharer, content position information of content currently being played currently upon receipt of a sharing instruction while the application program is playing the content. The application program may also send the content position information of the content currently being played to the application platform system of the sharer.

B: Generating a sharing address according to the content position information and publishing the sharing address, by the application platform system of the sharer.

C: starting a local sharing reading device of a recipient terminal, upon receipt of a triggering for the sharing address.

D: transforming, by the sharing reading device, a position information address in the sharing address into the content position information. The sharing reading device may trigger an application program to parse the content position information. The sharing reading device may positioning play the content corresponding to an access address of the shared content in the sharing address.

A system for sharing content played by an application program may include an application platform system, a sharing reading device, a sharing interface in the application program run in the application platform system, and a positioning playing interface in the application program run in an operating system.

The sharing interface in the application program may generate content position information of content currently being played. in response to receipt of a sharing instruction. The sharing instruction may be received while the application program is playing the content. The sharing interface may, further, send the content position information of the content played currently to a local application platform system.

The application platform system may include a sharing triggering module and a sharing publishing module.

The sharing triggering module may receive the sharing instruction for the content played by the application program, and notify the sharing interface in the application program of the received sharing instruction. and the sharing triggering module may also receive the content position information returned by the sharing interface.

The sharing publishing module may generate a sharing address according to the content position information and publish the sharing address.

The sharing reading device may be started upon receipt of a triggering for the sharing address. The sharing reading device may include a sharing receiving module and a program starting module.

The sharing receiving module may transform a position information address in the sharing address into the content position information.

The program starting module may trigger the application program and send the content position information or the content position information and an access address of the shared content in the sharing address to the positioning playing interface in the application program.

The positioning playing interface in the application program may receive the content position information or the content position information and the access address of the shared content sent by the sharing reading device. The positioning playing interface may parse the content position information to positioning play the shared content.

An application platform system may include a sharing triggering module and a sharing publishing module.

The sharing triggering module may receive a sharing instruction for content played by an application program, notify a sharing interface in the application program of the received sharing instruction. The sharing triggering module may also receive content position information returned by the sharing interface.

The sharing publishing module may generate a sharing address according to the content position information and publish the sharing address, in which the sharing address may trigger initiation of a sharing reading device.

T sharing reading device may be initiated after the sharing address is triggered.

The sharing reading device may include a sharing receiving module and a program starting module.

The sharing receiving module may transform a position information address in the sharing address into the content position information.

The program starting module trigger the application program and send the content position information or the content position information and an access address of the shared content in the sharing address to the positioning playing interface in the application program.

Accordingly, a playing position (namely, a playing progress) of the content being played may be recorded, using the content position information, when a user shares the content being played. The content position information may be shared together with the access address of the shared content, so as to achieve the positioning sharing of the content played by the application program. An application program in a local operating system of a recipient terminal may positioning play the shared content according to the content position information, thereby achieving the positioning playing of the shared content.

BRIEF DESCRIPTION OF THE DRAWINGS

To illustrate the technical solutions of the embodiments of the present disclosure more clearly, the drawings to be used in the description of the embodiments will be simply introduced below. Obviously, the drawings described in the following are just illustration of some embodiments of the present disclosure, and other drawings may be obtained by those skilled in the art in light of these drawings without any creative labor.

DETAILED DESCRIPTION OF THE EXEMPLARY EMBODIMENTS

In the following, the technical solutions of the embodiments are clearly and completely described in combination with the drawings. Obviously, the described embodiments are just some of the embodiments, but not all of the possible embodiments. Any other embodiments obtained by those skilled in the art based on the embodiments of the present disclosure without any creative labor fall within the scope of protection of the present disclosure.

An embodiment is provided as a method for sharing content played by an application program. The method may include at least the following steps.

A: Generating, by an application program in an application platform system of a sharer, content position information of content currently being played currently upon receipt of a sharing instruction while the application program is playing the content. The application program may also send the content position information of the content currently being played to the application platform system of the sharer.

B: Generating a sharing address according to the content position information and publishing the sharing address, by the application platform system of the sharer. and C: Transforming, by an application platform system of a recipient, a position information address in the sharing address into the content position information upon receipt of triggering for the sharing address. Further, the application platform system of the recipient, may initiate an application program to parse the content position information, to positioning play the content corresponding to an access address in the sharing address.

Figure 1:
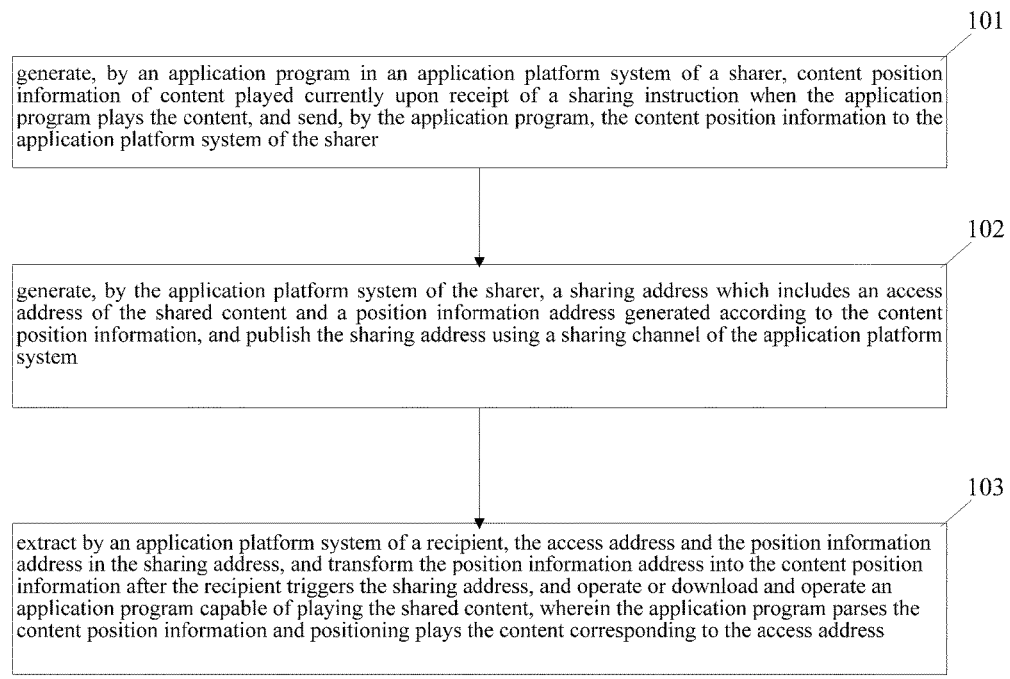
FIG. 1 is a flowchart of an example method for sharing content played by an application program.

FIG. 1 is a flowchart of an example method for sharing content played by the application program. Referring to FIG. 1, the flow includes the following steps.

Step 101 involves generating, by the application program in the application platform system of the sharer, content position information of content currently being played. The content position information may be generated in response to receipt of a sharing instruction while the application program is playing the content. The application program, as part of step 101, may also send the content position information to the application platform system of the sharer.

In Step 102, the application platform system of the sharer may generate a sharing address which may include an access address of the shared content and a position information address generated according to the content position information. The application platform system of the sharer may publish the sharing address using a sharing channel of the application platform system.

Step 103 depicts extracting, by an application platform system of a recipient, the access address and the position information address in the sharing address. The application platform system of the recipient may transform the position information address into the content position information once the recipient triggers the sharing address. The application platform system of the recipient may further operate an application program capable of playing the shared content. Alternatively, or in addition, the application platform system of the recipient may first download the application program capable of playing the shared content. The application program may parse the content position information and plays the content corresponding to the access address from the position indicated by the content position information.

The content played by the application program may be shared by the application platform system. Therefore, the sharer and the recipient may both operate the application platform system in a local terminal and further operate the corresponding application program in the application platform system. That is to say, all of the application programs involved in the method may be operated in the application platform system. The application platform system may be installed in the local terminal of the sharer or the recipient, and a user may directly login and use the application platform system. Alternatively, the application platform system may also be operated on a web server, and the user may login to the server by connecting the local terminal to the network to operate the application platform system. Generally, such an application platform system operated on the server is referred to as a web application platform system.

The sharing channel of the application platform system may be a network communication system based on the application platform system. The user for the network communication system may login to the application platform system and then login to the network communication system using the application platform system. This may allow communicating and interacting via the network with another user, such as a friend, colleague, acquaintance or any other user. The network communication system may be an instant communication system, a mail system, a short message system, a blog system, a microblog system, a web log system, a network space system or any other communication system based on the application platform system. Generally, the recipient for the shared content may be a user who has the authority to interact with the sharer, for example, a friend in the application platform system.

The application platform system may provide options related to the sharing channel for the sharer to select. The application platform system may also publish the sharing address using the corresponding sharing channel according to a selected instruction by the sharer. For example, the sharer may select to send the sharing address to the recipient by way of instant information via the instant communication system, or as a mail via the mail system, or as a short message via the short message system. The recipient may open the mail or the short message in the application platform system to trigger (for example, by clicking) the sharing address. Alternatively, the sharer may send the sharing address to the recipient via the blog system or the microblog system by publishing a blog including the sharing address. Users who log into the blog or the microblog of the sharer via the application platform system may see and trigger the sharing address. By triggering the sharing address, an application program corresponding to the sharing address may be operated and/or downloaded and operated by the application platform system. The application program may play the shared content from a requested position, instead of the starting point of the shared content. Further, the sharer may send the sharing address via the web log system or the network space system to publish a log including the sharing address. The users who login to the web log or the network space of the sharer by the application platform system may see and trigger the sharing address. Such triggering may also invoke the application platform system to operate or download and operate the corresponding application program by to play the shared content from the requested position.

The application program of the sharer which may be playing the content in Step 101 may be a content application program i.e. an application program containing content. Alternatively, or in addition, the application program may be a specific playing application program specialized to play content from a third party.

The content application program may contain the content to be played, such as a video file application program, an audio file application program, or an e-book application program. The video file application program may be provided with a video player to directly play the video content in the application program. The audio file application program may be provided with an audio player to directly play the audio content in the application program. The e-book application program may be provided with a reader to directly show the content in the e-book. The application programs may have specific content position information when playing content, such as, the playing progress of the video and the audio, or the page currently being read of the e-book. Other information regarding the progress of playing the content may also be recorded.

The playing application program, on the other hand, may not contain the content to be displayed, but may be specialized to play a file from a third party. For example, the video play application program may play a video file, the audio play application program may play an audio file, and the e-book play application program (also known as e-reading application program) may play an e-book. Also, the play application programs may have specific content position information when playing content, such as, the playing progress of the video and the audio, or the page currently being read of the e-book. The content position may also be recorded in other forms such as the next page to be read, or the next frame in the video.

In the application platform system of the sharer, if it is desired to share the content to be displayed in the content application program, the content application program may be shared directly. Since the content to be displayed in the content application program and the application program are inseparable, the content may also be shared this way. Instead, if it is desired to share the content to be played by the play application program, an access address of the content to be played may be shared.

Several examples of the method for sharing played content of application are described further.

First Embodiment

The application program in Step A above may be a content application program. The access address of the shared content in Step B above may be a download address of the content application program.

Step C may further include transforming, by the application platform system of the recipient, the position information address into the content position information. The transformation may be undertaken upon receipt of the triggering for the sharing address. Further, the application platform system of the recipient may download the content application program from the download address and operate the content application program. The content application program may parse the content position information, to play the content in the content application program from a particular position indicated by the content position information.

In another example method according to the first embodiment, the application program which is playing content in the application platform system of the sharer in Step 101 may be a content application program. The access address of the shared content in Step 102 may be a download address of the content application program. In this case, Step 103 may include downloading and running, by the application platform system of the recipient, the content application program being used in Step 101 according to the download address. The content application program may parses the content position information and play the content in the content application program at the position indicated by the content position information. This may be referred to as positional play, or positionally playing the content. In the first embodiment, the generation and parsing of the content position information may be executed by the same content application program, but the content application program for generating the content position information may be operated in the application platform system of the sharer, while the content application program for parsing the content position information may be operated in the application platform system of the recipient. Therefore, each of the content application programs may use a respective closed expression format to express the content position information.

Figure 2:
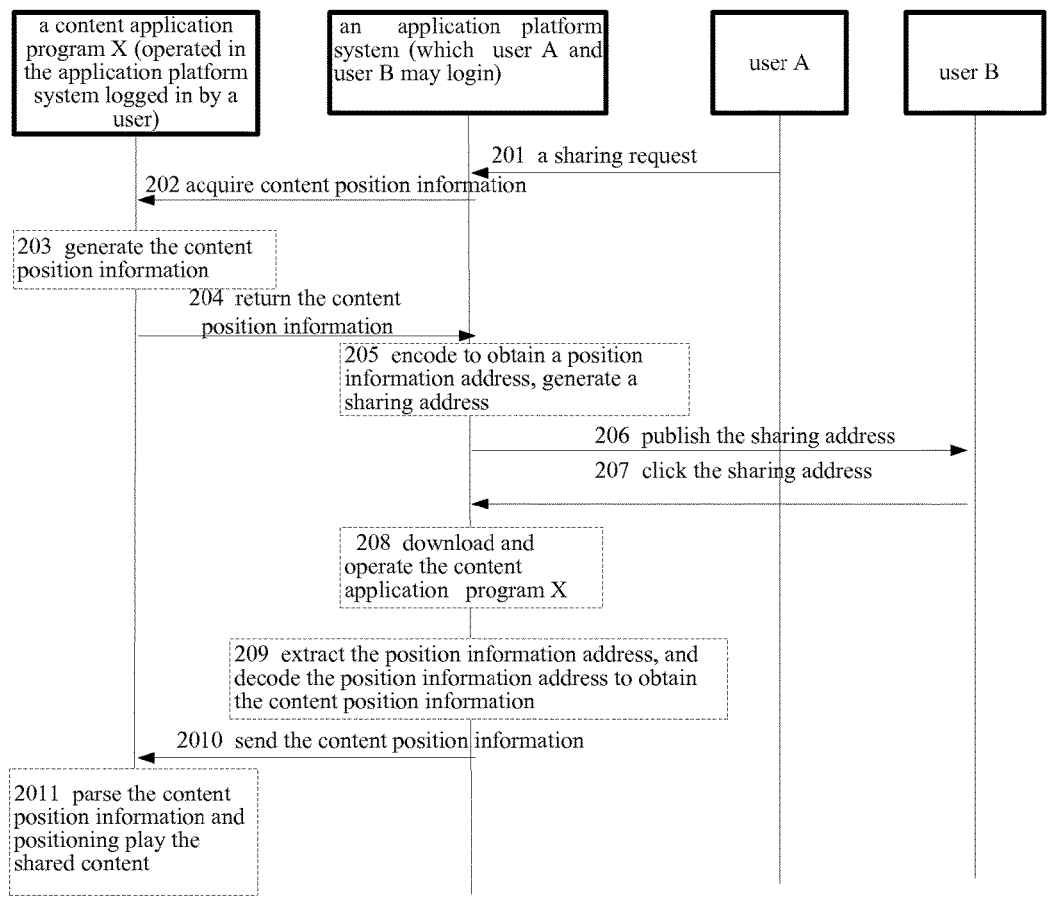
FIG. 2 is a flowchart of an example method for sharing content played by an application program according to a first embodiment.

FIG. 2 provides a flowchart of an example method according to the first embodiment of the invention. Referring to FIG. 2, and assuming that user A is the sharer and user B is the recipient, the flow illustrates the following steps.

In step 201 the user A may click a sharing button to share a certain content application program X. This may send a sharing request to the application platform system executing the application program X. User A may be logged in to the application platform system while using the content application program X in the application platform system. The sharing request may include an identifier (ID) of the shared content application program X.

For example, in the case where the user A operates a certain video type application program, the user A may find a certain segment of content in the video type application program is worth sharing. The user A may click the sharing button to share the video type application program and the position of the segment of content.

In Step 202, the application platform system, into which user A may be logged into may send a request for acquiring content position information to the content application program X identified by the ID in the sharing request.

In Step 203, the content application program X i.e. the content application program X which the user A is using currently may generate the content position information according to the current operating progress of the content application program X. For example, the playing progress for the video type application program may be used to generate the content position information, in case the content being played is a video file. The content application program X may be operated in the application platform system of the user A. The content position information may be generated on receiving a request for acquiring the content position information.

In the embodiment, each of the content application programs may use a different format and information to express the current operating progress of the application program. Thus, different content application programs may generate different content position information. The application platform system may not parse the content position information unless the content application program X is capable of parsing the content position information generated by the content application program X.

The content position information, or simply position information, may include, for example, at least the following information.

In case of an audio type/video type application program, the position information may include an identification and name of the audio/video currently being played. The position information may include which season and which episode the audio/video played currently is in and which second in the episode the audio/video played currently is at.

In case of a digital book application program, commonly referred to as an e-book type application program, such as a name of the book being read, which chapter and which section of the book is currently being read, and which page of the section is read currently may be included. Alternatively, or in addition, the position information may include the face of the book and which page of the total pages of the book is currently being read.

Similarly, the position information of the application program with other content type may be generated and parsed by the application program.

The content position information may be expressed using various formats such as JSON (JavaScript Object Notation), for convenience to expand.

In Step 204, the content application program X may return the generated content position information to the application platform system.

In Step 205, the application platform system may perform an address encoding process (such as a base64 process) to the content position information to obtain a position information address. The address encoding process may be initiated upon receipt of the content position information. The application platform system may determine the download address of the shared content application program X and use the download address as the access address of the shared content. The application platform system may further combine the download address of the content application program X and the encoded position information address into a sharing address. If the length of the sharing address exceeds a predetermined length, an address shortening process may also be performed to compress the sharing address into a shorter address.

In Step 206, the application platform system may publish the sharing address by using the sharing channel of the application platform system. In this case, any user with authority for interaction with the sharer (such as, a friend user B of the sharer) in the application platform system may see and click the sharing address.

In Step 207, if a friend (i.e. a recipient, such as the user B) in the application platform system of the user A clicks the sharing address after seeing the sharing address, a request for acquiring the shared content may be sent to the application platform system of the user B (i.e. the application platform system logged into by the user B).

In Step 208, the application platform system may extract an access address (i.e. the download address of the content application program X) from the sharing address. The extraction may be triggered by clicking the sharing address. The clicking and extraction may further cause the application platform system of the user B to download the content application program X to the application platform system of the user B from the download address. The application platform system may further install and operate the content application program X.

In Step 209, the application platform system of the user B may extract the position information address included in the sharing address, and transform the position information address into the content position information. The transformation may involve decoding the position information which may be a counterpart operation of the encoding operation described earlier. It may be noted that it may be possible to perform Step 208 and Step 209 in any order.

In Step 2010, the application platform system may send the content position information to the content application program X operated in the application platform system of the user B.

In step 2011, the content application program X operated in the application platform system of user B may parse the content position information and perform a positional play of the shared content according to the parsed position information.

For example, with regard to an audio type/video type application program, such as the identification and name of the audio/video currently being played, the season and episode of the audio/video being played and further, the second in the episode may be obtained by parsing the position information. The positional play may directly place the playing progress according to the information and start playback of the audio/video content from the parsed position. Thus, the content may be positioned and shown to the user B based on the current playing progress being shared by user A.

Second Embodiment

In this embodiment, the application program in Step A may be a play application program. In this case, the access address of the shared content in Step B may include a download address and a played content access address of the play application program.

Step C may include transforming, by the application platform system of the recipient, the position information address into the content position information upon receipt of the triggering for the sharing address. The application platform system of the recipient may further download the play application program from the download address. The application platform system may then operate the play application program to parse the content position information and play the content corresponding to the played content access address based on the parsed content position information.

In the Second embodiment, the application program, which is playing content in the application platform system of the sharer in Step 101, may be a play application program. As described earlier, the play application program may not contain the content to be played by itself. The content played by the play application program may have a special access address. The access address of the shared content in Step 102 may include the download address and the access address of the contents to be displayed by the play application program.

Step 103 may include downloading and operating, by the application platform system of the recipient, the play application program. The play application program is the application program capable of playing the shared content. The play application program may be the same application referred to in Step 101. The play application program may be downloaded using the download address. The play application program may parse the content position information and perform positional play using the content corresponding to the played content access address and the parsed content position information.

Figure 3:
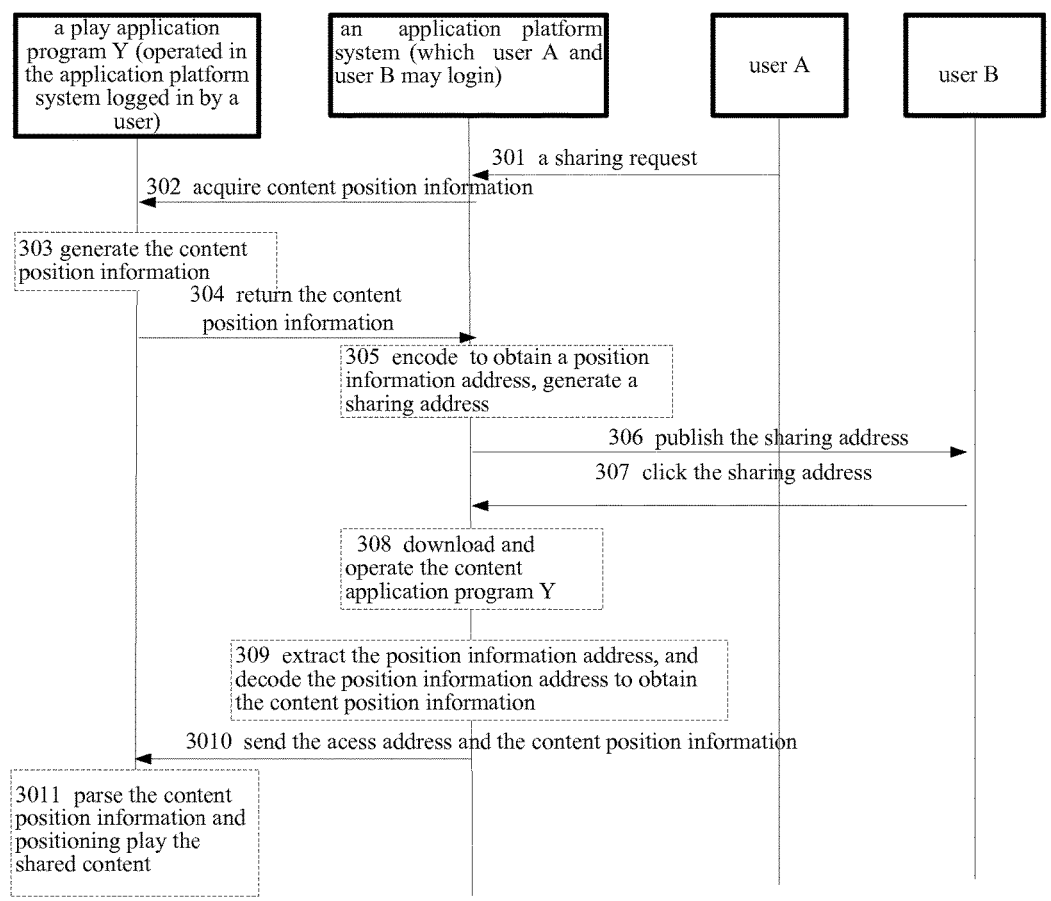
FIG. 3 is a flowchart of an example method for sharing content played by an application program according a second embodiment.

FIG. 3 is a flowchart of an example method for sharing content played by an application program according to the second embodiment. The flow includes the following steps.

In step 301 the user A may click a sharing button for sharing a certain play application program Y to send a sharing request to the application platform system. User A may be logged into the application platform system when using the play application program Y. User A may be using the play application program Y to play content in the application platform system. In this example, it is assumed that the play application program Y is a video type play application program playing a video content. The play application program may be capable of playing any other content, for example, but not limited to audio, e-books, animation and any other content. The sharing request may include the ID of the shared application program Y.

In Step 302, the application platform system of the user A may send a request for acquiring content position information to the play application program Y identified by the ID in the sharing request.

In Step 303, the play application program Y (i.e. the play application program Y which the user A is using currently, that is to say, the play application program Y being operated in the application platform system of the user A) generates the content position information according to the current operating progress of the play application program Y. For example, the playing progress for the video type application program may be used for generating the content position information. The content position information generation may be performed in response to receipt of the request for acquiring content position information.

In the embodiment, each of the play application programs may use a different format and information to express the current running progress of the application program. Thus, different content application programs may generate different content position information. The application platform system may not parse the content position information unless the play application program Y is capable of parsing the content position information generated by the play application program Y. The content position information may be referred to simply as position information.

In Step 304, the play application program Y may return the generated content position information to the application platform system.

In Step 305, the application platform system may perform an address encoding process (such as a base64 process) to the content position information to obtain a position information address. The address encoding process may be initiated upon receipt of the content position information. The application platform system may determine the download address and the current played content access address of the shared play application program Y. The access address may be obtained from the play application program Y. The application platform system may take the download address and the played content access address of the play application program Y as an access address of the shared content. The application platform system may further combine the download address, the played content access address of the play application program Y, and the encoded position information address into a sharing address. If the length of the sharing address exceeds a predetermined length, an address shortening process may also be performed to compress the sharing address into a shorter address.

In step 306: the application platform system may publish the sharing address by using the sharing channel of the application platform system. In this case, the users authorized to interact with the sharer (such as, a friend user B of the sharer) in the application platform system may see and click the sharing address.

In Step 307, if a friend (i.e. a recipient, such as the user B assumed herein) of the user A in the application platform system clicks the sharing address after seeing the sharing address, a request for acquiring the shared content may be sent to the application platform system of the user B (i.e. the application platform system of the user B).

In Step 308, the application platform system may extract the download address (i.e. the download address of the play application program Y) and the played content access address in the sharing address after the sharing address is clicked. The application platform system may download the play application program Y to the application platform system of the user B from the download address and install and operates the play application program Y in the application platform system.

In Step 309, the application platform system of the user B may extract a position information address included in the sharing address, and decode the position information address for the content position information. Steps 308 and 309 may be possibly performed in any order.

In Step 3010, the application platform system may send the content position information and the played content access address to the play application program Y operated in the application platform system of the user B.

In Step 3011, the play application program Y operated in the application platform system of the user B may access the played content access address and parse the content position information. The play application program Y operated in the application platform system of the user B may positionally play the content corresponding to the access address according to the parsed information. In one example, the content may be played while being downloaded according to the access address. Alternatively, the content may also be played after being completely downloaded.

Third Embodiment

A default application program for playing a particular type of content may be provided in an application platform system.

The application program in Step A may be a content application program, which includes a content type. The access address of the shared content in Step B, in this a case, may be a download address of the content application program.

Step C may include downloading, by the application platform system of the recipient, the content application program from the download address upon receipt of the triggering for the sharing address. Step C may further include transforming, by the application platform system of the recipient, the position information address into the content position information, and operating, the default application program according to the content type in the content position information. The default application may be operated to parse the content position information, and to positionally play the content application program.

The content application program may play the content included in the content application program. Alternatively, the content may be played by a play application program capable of playing the same type of content as the content application program. Therefore, in the third embodiment, the different application programs may be used for playing the played content shared by the sharer. However, with regard to the same content type, such as a video type, the different application programs may use the same expressing format (namely the unified standard interface) for content position information. In this way, one application program may parse the position information generated by other different application program, as long as there is the same content type. Taking a video type as an example, the standard interface of the position information may be, for example, in the following format.

```
{
  "type": "video",
  "video id": "id for uniquely identifying a video (the id is not the id of the application program per se) ",
       "name": "the name of the video",
       "author": "author",
       "season": "which season",
       "episode": "which episode",
       "seconds": "which second in the episode of the video"
}
```

For the video type application program, all of the video type application programs may generate the position information by using the above-mentioned standard interface format. Therefore, one video type application program may parse the position information generated by other different video type application programs. The content position information may be expressed in the format of json, for convenience to expand.

In the third embodiment, the application platform system may automatically set a default application program for playing a certain content type. For example, an application program V may be used by default for playing video type content, an application program M may be used by default for playing audio type content, and an application program E may be used by default for playing e-book type content. The default application program may be set and/or changed by the user manually.

In the third embodiment, the application program in Step 101 may be a content application program, which may be played and operated by a play application program capable of playing the same type of content as the content application program. The access address of the shared content in Step 102 may be a download address of the content application program. The content position information may include the content type. For example, the "type" in the above-mentioned standard interface may be used to identify the content type, and the "video" may represent video type. Step 103 may include extracting, by the application platform system of the recipient, the access address and the position information address in the sharing address after the recipient clicks the sharing address. Step 103 may further include downloading, by the application platform system of the recipient, the content application program from the download address and transforming the position information address into the content position information. The application platform system of the recipient may also determine the content type of the content application program according to the content position information. For example, the content position information may be expressed using the standard format. Accordingly, the application platform system may also parse the content position information to obtain the content, and the content type. The application platform system of the recipient may further operate the default application program to parse the content position information. The default application program may also perform positional play on the content application program.

In the following example of third embodiment, using video content as an example of shared content, it is assumed that the user A installs and plays a content application program X provided as the default application by the manufacturer C of the application platform system of user A. User A may be logged in to the application platform system. In this example, the content application program X may be a video type application program, in which video content is included. It is further assumed that user B installs a video type play application program D of the video application program manufacturer D in the application platform system of user B. Further, assume that the user B sets the play application program D as the default application program for playing the video type content. User B may be logged in to the application platform of user B. The application program X and the application program D both may use the standard interface to generate and parse a position information of the content.

Figure 4:
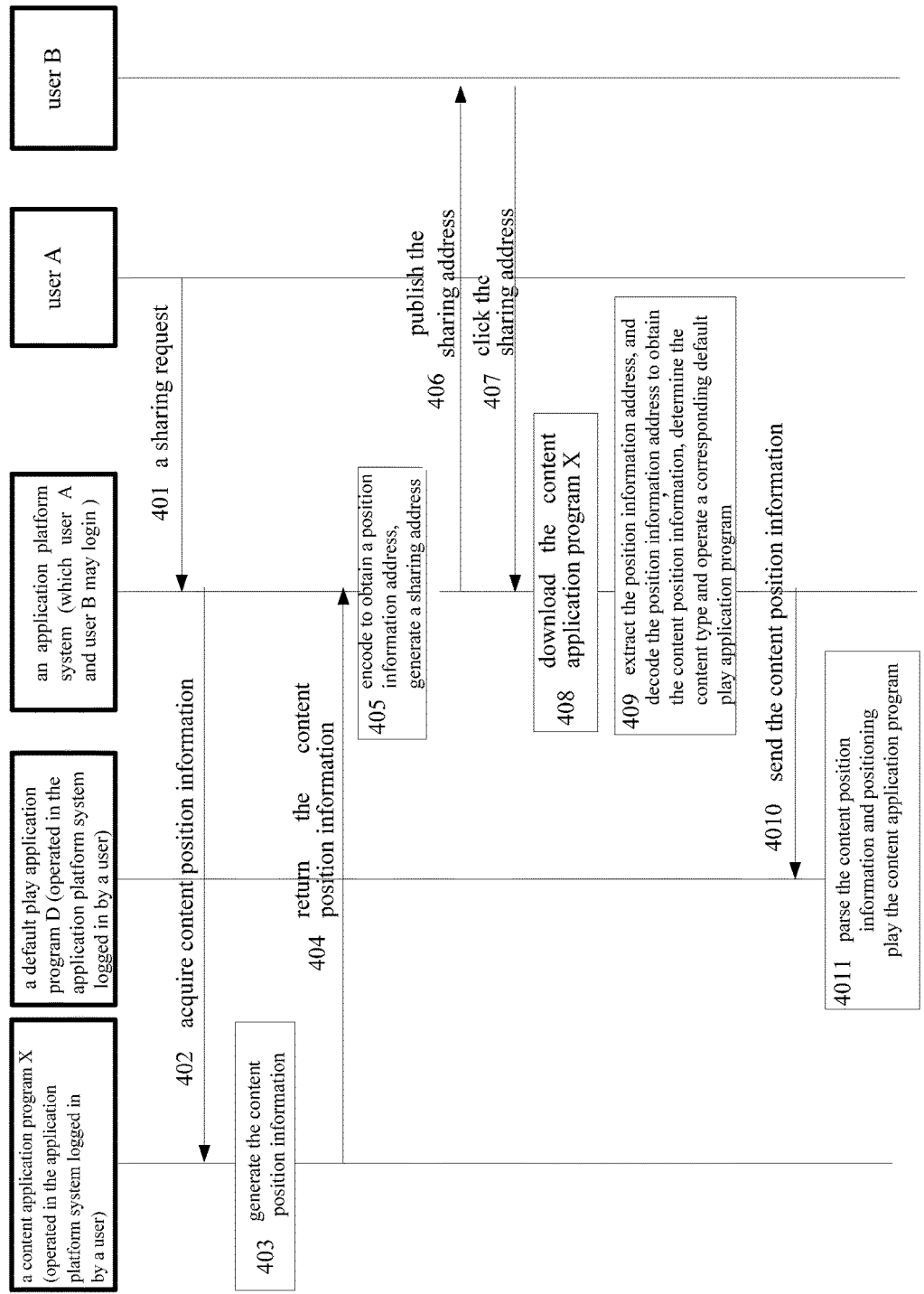
FIG. 4 is a flowchart of an example method for sharing content played by an application program according to a third.

FIG. 4 is a flowchart of an example method for sharing content played by an application program according to the third embodiment. In the flow, the user A shares the video content being played by the content application program X to the user B. Step 401 to Step 407 operate similar to the above-mentioned Step 201 to Step 207 according to the first embodiment shown in FIG. 2, the description is not repeated here. The flow after Step 407 is described in detail as follows.

In Step 408, the application platform system logged of user B may extract an access address (i.e. the download address of the content application program X) from the sharing address after user B clicks the sharing address. The application platform system may download the content application program X to the application platform system of the user B from the download address. The application platform system may install and operate the content application program X in the application platform system.

In Step 409, the application platform system of user B may extracts a position information address from the sharing address, and decode the position information address for the content position information. The application platform system determine the type of the shared content according to the content type included in the content position information. The content position information may be expressed using the standard interface. Therefore, the application platform system may also parse the content position information to obtain specific information, such as the content type. For example, the content type may be a video type. The application platform system of the user B may then start the default application program for playing the video type content. Thus, as per this example, the play application program D installed in the application platform system of the user B may be started to play the content application program X. Thus, the play application program D is a second play application program, other than the content application program X. As described earlier, application program D may be the default application program on the application program system of user B for playing the shared content type.

In Step 4010, the application platform system of user B may send the content position information to the play application program D.

In Step 4011, the play application program D may parse the position information according to the standard interface format. The play application program D may further position play the content application program X according to the parsed information. That is, the application program D may position play the video content in the content application program X, using the position information expressed in the position information using the standard interface format.

For example, with regard to a video type content played by the shared content application program X, the second play application program may parse the position information to obtain the identification and name of the video played currently. For example the position information may contain which series, which season, and which episode the video is from, and which second in the episode on the playback is currently placed on. The playing progress may be directly positioned according to the above information, and the content playback may begin from the above position based and shown to the user B.

Fourth Embodiment

A default application program for playing a particular type of content is provided in an application platform system.

The application program in Step A may be a play application program. In this case, the access address of the shared content in Step B may include a played content access address of the play application program. The played content access address may include a content type, or the content position information may include a content type.

Step C may include transforming, by the application platform system of the recipient, the position information address into the content position information upon receipt of the triggering for the sharing address. The step C may further include the application platform system of the recipient operating the default application program according to the content type in the played content access address or the content position information to parse the content position information. The default application program may also position play the content corresponding to the played content access address.

The fourth embodiment similar to the third embodiment, may involve different application programs for playing the content shared by the sharer. However, with regard to the same content type, such as a video type, the same expressing format (namely the unified standard interface) for content position information may be used by the different application programs. In this case, as long as the content types are the same, one application program may parse the position information generated by other application programs. For example, for the video type application program, all of the video type application programs a standard interface format, such as the example format described above, to generate the position information. Therefore, one video type application program may parse the position information generated by other different video type application program.

Similar to the third embodiment, the application platform system according to the fourth embodiment may automatically set a default application program for playing a certain content type. For example, an application program V may be used by default for playing the video type content, an application program M may be used by default for playing the audio type content, and an application program E may be used by default for playing the e-book type content. The default application program may be set and/or changed by the user manually.

The fourth embodiment may differ from the third embodiment in that, the application program in Step 101 may be a play application program which may not include the played content. Further, the content played by the play application program may have a special access address. The access address of the shared content in Step 102 may be a played content access address of the play application program. The played content access address may include the content type or the content position information may include the content type. For example, the "type" in the above-mentioned standard interface may identify content type, and the "video" may represent video type. The access address may also include the extension name of video format such as "avi", "rmvb" to represent video type. Step 103 may include extracting, by the application platform system of the recipient, the access address and the position information address in the sharing address after the recipient clicks the sharing address, and transforming the position information address into the content position information. The application platform system of the recipient may determine the content type of the played content according to the played content access address or the content position information. Here, the expressing format of the content position information may be a standard format, and therefore, the application platform system may also parse the content position information to obtain the content, and the position information may include the content type. The application platform system of the recipient may operate the default application program capable of playing content of the content type. The default application program may parse the content position information and position play the content corresponding to the played content access address.

In the following description of fourth embodiment, taking video content as an example, it is assumed that the user A installs a play application program Y in the application platform system of user A. The play application program Y is used to play video content. It is also assumed that the user B installs a video type play application program D of the video application program manufacturer D in the application platform system of user B. User B sets the play application program D as the default application program for playing video type application program. The application program Y and the application program D both may use the standard interface to generate a position information of the played content and parse the position information. User A and user B may be logged in to their respective systems. Although, the description involves video content, a person of ordinary skill in the art would be able to use the description for other types of content, such as audio, digital books and other such content.

Figure 5:
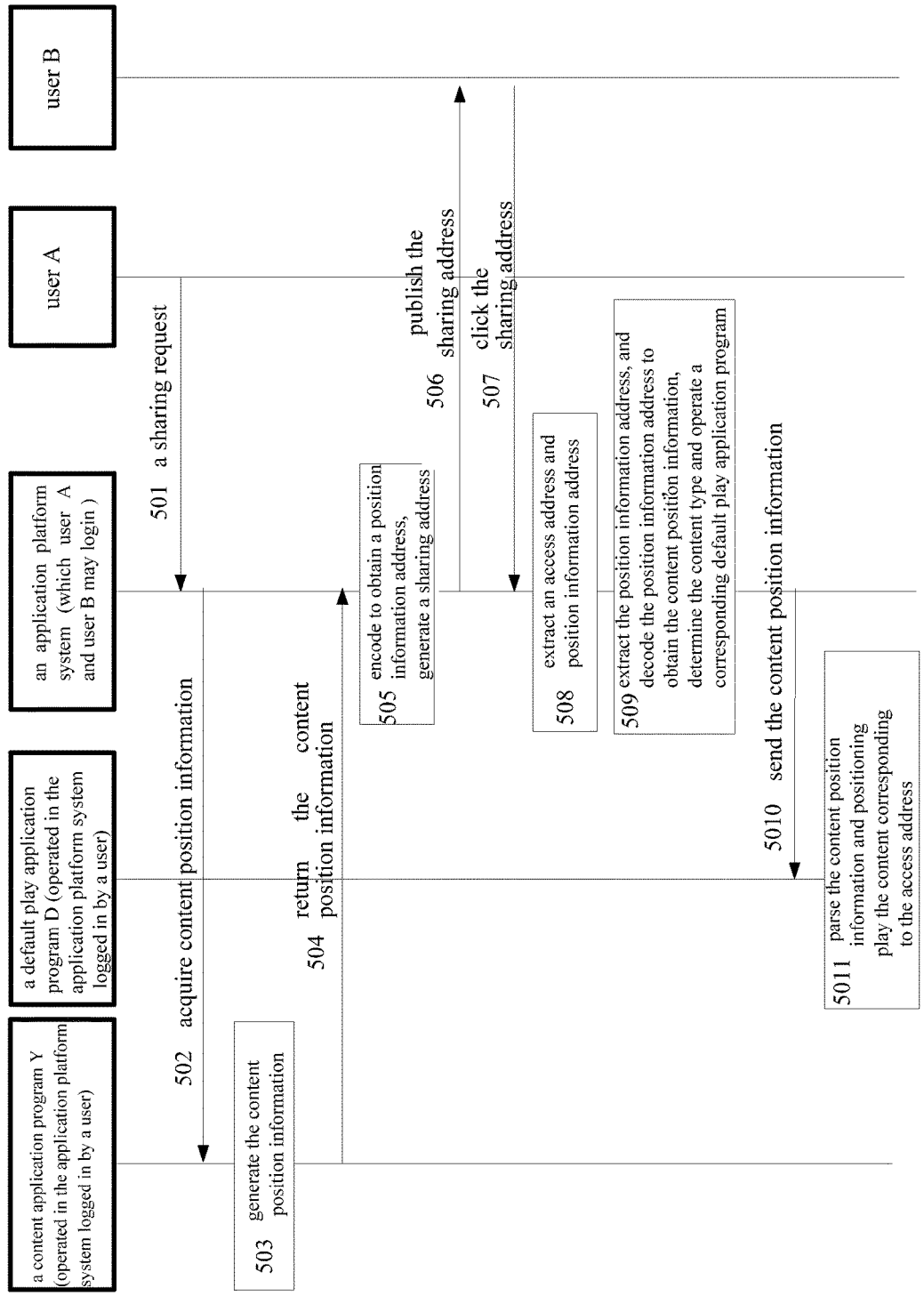
FIG. 5 is a flowchart of an example method for sharing content played by an application program according to a fourth embodiment.

FIG. 5 is a flowchart of an example method for sharing content played by the application program according to the fourth embodiment of the invention. In the flow, the user A shares the video content being played by the play application program Y with the user B. The flow includes the following steps.

In Step 501, the user A may click a sharing button for sharing a certain play application program Y to send a sharing request to the application platform system of user A, while the user A uses the play application program Y to play the content. As is assumed for this example, the play application program Y is a video type play application program in which the played content is video content. The sharing request may include the ID of the shared application program Y.

In Step 502, the application platform system of user A may send a request for acquiring content position information to the play application program Y identified by the ID in the sharing request.

In Step 503, the play application program Y may generates the content position information in a standard interface format according to the current playback progress of the play application program Y in response receipt of the request for acquiring content position information.

In Step 504, the play application program Y may return the generated content position information to the application platform system.

In Step 505, the application platform system may perform an address encoding process (such as a base64 process) on the content position information to obtain a position information address. The application platform system may determine the current played content access address of the shared play application program Y. The access address may be obtained from the play application program Y. The application platform system may use the played content access address of the play application program Y as an access address of the shared content. The application platform system may further combine the played content access address of the play application program Y and the encoded position information address into a sharing address. If the length of the sharing address exceeds a predetermined length, an address shortening process may also be performed to compress the sharing address into a shorter address.

In Step 506, the application platform system may publish the sharing address by using the sharing channel of the application platform system. The users who have authority for interaction with the sharer (such as, a friend user B of the sharer) in the application platform system may see and click the sharing address.

In Step 507, if a friend (i.e. a recipient, such as the user B assumed herein) of the user A in the application platform system clicks the sharing address after seeing the sharing address, a request for acquiring the shared content may be sent to the application platform system of the user B (i.e. the application platform system logged in by the user B).

In Step 508, the application platform system of user B may extract the access address and the position information address from the sharing address after the user B clicks the sharing address.

In Step 509, the application platform system of user B may decode the position information address for the content position information, and determine the type of the shared content according to the content type included in the content position information. The content position information may be expressed in the standard interface. The application platform system may also parse the content position information to obtain the type of the shared content using the content type included in the played content access address. For example, in this case, the content type is a video type. The application platform system of the user B may then start the default application program for playing the video type content. Thus, as per this example, the play application program D installed in the application platform system of the user B may be started to play the content application program Y. Thus, the play application program D is a second play application program, other than the content application program Y. As described earlier, application program D may be the default application program on the application program system of user B for playing the shared content type.

In Step 5010, the application platform system of user B may send the played content access address and the content position information to the play application program D.

In Step 5011, the play application program D may parse the position information according to the standard interface format and position play the content corresponding to the played content access address according to the parsed information. The application program D may parse such information, since the position information expresses the information thereof by using the standard interface format.

In the third embodiment and the fourth embodiment, the content position information is in the standard interface expressing format, and therefore, an industry standard may be formed and the content position information may be standardized, thereby the compatibility between the different application programs to share content is improved and user experience may be improved.

A system for sharing content played by an application program, may operate to perform at least the steps described in the above examples. The sharing system may include an application platform system and a sharing interface and a position playing interface in the application program. The application program may operate based on the application platform system.

The sharing interface in the application program may generate content position information of content being currently played. The content position information may be generated in response to receipt of a sharing instruction and when the application program is playing the content. and the sharing interface may further send the content position information of the content being currently played to a local application platform system.

The application platform system may include a sharing triggering module, a sharing publishing module, and a sharing receiving module.

The sharing triggering module may receive a sharing instruction for the content being currently played by the application program. The sharing triggering module may notify the sharing interface in the application program of the sharing instruction. The sharing triggering module may also receive the content position information returned by the sharing interface.

The sharing publishing module may generate a sharing address according to the content position information and publish the sharing address.

The sharing receiving module may transform a position information address in the sharing address into the content position information upon receipt of the triggering for the sharing address. The sharing receiving module, may in turn, trigger the application program to send the content position information or send the content position information and an access address of the shared content in the sharing address to the positioning playing interface in the application program.

The positioning playing interface in the application program may receive the content position information or the content position information and the access address of the shared content sent by the application platform system, and parses the content position information to play the shared content from a particular playback position, instead of the start.

In one example embodiment, the application program to which the sharing interface belongs may be a content application program, and the access address of the shared content may be a download address of the content application program.

The sharing receiving module may transform the position information address into the content position information upon receipt of the triggering for the sharing address. The sharing receiving module may also download the content application program from the download address and operate the content application program. The sharing receiving module may further send the content position information to the positioning playing interface in the content application program. Alternatively, or in addition, the sharing receiving module may download the content application program from the download address, or operate a default application program according to the content type in the content position information. The sharing receiving module may send the content position information to the positioning playing interface in the default application program. The positioning playing interface may parse the content position information and position play the content application program.

In another example of the embodiment, the application program to which the sharing interface belongs may be a play application program, and the access address of the shared content may include a download address and a played content access address of the play application program.

The sharing receiving module may transform the position information address into the content position information upon receipt of the triggering for the sharing address. The sharing receiving module, in this case, may download the play application program from the download address and operate the play application program. The sharing receiving module may then send the content position information and the played content access address to the positioning playing interface in the play application program. The positioning playing interface may parse the content position information, to position play the content corresponding to the played content access address.

In yet another example embodiment, the application program to which the sharing interface belongs may be a play application program, and the access address of the shared content may be a played content access address of the play application program.

In this case, the sharing receiving module may transform the position information address into the content position information upon receipt of the triggering for the sharing address, and operate a default application program according to the content type. The content type may be obtained from the played content access address or the content position information. The sharing receiving module may send the content position information and the played content access address to the positioning playing interface in the default application program. The positioning playing interface may parse the content position information, and position play the content using the played content access address. Position playing the content refers to starting playback (or viewing) of the content from a specific playback position instead of the starting point of the content. For example, video or audio content may be played back from a point in the middle of the content rather than from the starting point. Similarly, a digital book, or an e-book may be displayed from an intermediate page, for example, page 20 instead of page 1.

The present disclosure involves an application platform system. The application platform system may include a sharing triggering module, a sharing publishing module and a sharing receiving module.

The sharing triggering module may receive a sharing instruction for the content played by the application program. The sharing triggering module may also notify the sharing instruction to the application program, and receive the content position information returned by the application program.

The sharing publishing module may generate a sharing address according to the content position information and publish the sharing address.

The sharing receiving module may transform a position information address in the sharing address into the content position information upon receipt of the triggering for the sharing address. The sharing receiving module may itself trigger the application program to send the content position information or the content position information and an access address of the shared content in the sharing address to the application program.

In one example embodiment, the access address of the shared content may be a download address of the content application program.

The sharing receiving module may transform the position information address into the content position information upon receipt of the triggering for the sharing address. The sharing receiving module may also download the content application program from the download address and operate the content application program. The sharing receiving module may further send the content position information to the content application program. Alternatively, the sharing receiving module may download the content application program from the download address, and operate the default application program according to the content type in the content position information to play the content application program. The sharing receiving module may send the content position information to the default application program.

In another embodiment, the access address of the shared content may include a download address and a played content access address of the play application program.

The sharing receiving module may transform the position information address into the content position information upon receipt of the triggering for the sharing address. The sharing receiving module may download the play application program from the download address and operate the play application program. The sharing receiving module may further send the content position information and the played content access address to the play application program.

In yet another embodiment, the access address of the shared content may be a played content access address of the play application program.

The sharing receiving module may transform the position information address into the content position information upon receipt of the triggering for the sharing address. The sharing receiving module may then operate a default application program according to the content type in the played content access address or the content position information. The sharing receiving module may also send the content position information and the played content access address to the default application program.

Figure 6:
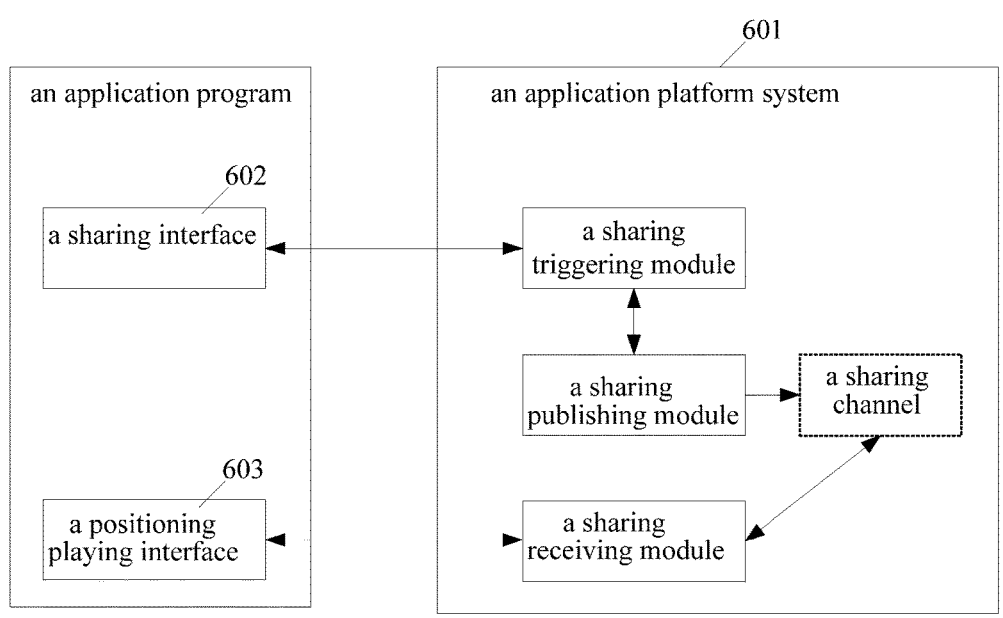
FIG. 6 is a schematic diagram of an example system for sharing content played by an application program.

FIG. 6 is a schematic diagram of an example system for sharing content played by the application program according to the examples described. Referring to FIG. 6, the sharing system includes an application platform system device 601, a sharing interface 602, and a positioning playing interface 603 in the application program. The application program may be operated based on the application platform system device 601.

The sharing interface 602 in the application program may generate content position information of content currently being played upon receipt of a sharing instruction while the application program is playing the content. The sharing interface 602 may also send the content position information to the local application platform system device 601.

The application platform system 601 may further include a sharing triggering module, a sharing publishing module and a sharing receiving module.

The sharing triggering module may receive a sharing instruction for the content being currently played by the application program. The sharing triggering module may notify the sharing interface 602 in the application program of the sharing instruction. The sharing triggering module may also receive the content position information returned by the sharing interface 602.

The sharing publishing module may generate a sharing address. The sharing address may include the access address of the shared content and the position information address generated according to the content position information. The sharing publishing module may also publish the sharing address using the sharing channel of the application platform system.

The sharing receiving module may transform a position information address in the sharing address into the content position information upon receipt of the triggering for the sharing address. The sharing receiving module, may in turn, trigger the application program to send the content position information or send the content position information and an access address of the shared content in the sharing address to the positioning playing interface 603 in the application program.

The positioning playing interface 603 in the application program may receive the content position information or the content position information and the access address of the shared content sent by the application platform system 601, and parses the content position information to play the shared content from a particular playback position, instead of the start.

In one embodiment, the application program to which the sharing interface 602 belongs may be a content application program, and the access address of the shared content may be a download address of the content application program. The sharing receiving module may extract the download address and the position information address in the sharing address. The sharing receiving module may operate in response to a click on the sharing address. The sharing receiving module may also transform the position information address into the content position information, and download the content application program from the download address and operate the content application program. The sharing receiving module may further send the content position information to the positioning playing interface 603 in the content application program. Alternatively, the sharing receiving module may download the content application program from the download address, and determine the content type of the content application program. The sharing receiving module may further operate a default application program capable of playing content of the content type in the application platform system 601 to play the content application program. The sharing receiving module may further send the content position information to the positioning playing interface 603 in the default application program. The positioning playing interface 603 may parse the content position information, and position plays the content application program.

In another embodiment, the application program to which the sharing interface 602 belongs may be a play application program, and the access address of the shared content may be a download address and a played content access address of the play application program. The sharing receiving module may extract the download address, the access address and the position information address in the sharing address after the recipient clicks the sharing address. The sharing receiving module may transform the position information address into the content position information. The sharing receiving module, in this case, may also download the play application program from the download address and operate the play application program. The sharing receiving module may further send the content position information and the played content access address to the positioning playing interface 603 in the play application program. The positioning playing interface 603 may, in turn, parse the content position information and position play the content corresponding to the played content access address.

In yet another embodiment, the application program to which the sharing interface 602 belongs may be a play application program, and the access address of the shared content sent to the application platform system 601 may be the played content access address of the play application program. The sharing receiving module may extract the access address and the position information address in the sharing address after the recipient clicks the sharing address. The sharing receiving module may also transform the position information address into the content position information. Further, the sharing receiving module may determine the content type of the played content. The sharing receiving module may also operate a default application program capable of playing content of the content type in the application platform system 601. Further yet, the sharing receiving module may send the content position information and the played content access address to the positioning playing interface 603 in the default application program. The positioning playing interface 603 may parse the content position information, to play the content from a playback position corresponding to the played content access address.

An embodiment of the invention may further provide a method for sharing content played by an application program. The method may include at least the following steps.

A: Generating, by an application program in an application platform system of a sharer, content position information of content currently being played by the application program upon receipt of a sharing instruction. The application program may further send the content position information of the content played currently to the application platform system of the sharer.

B: Generating a sharing address according to the content position information and publishing the sharing address, by the application platform system of the sharer.

C: Starting a local sharing reading device of a recipient terminal, upon receipt of a triggering for the sharing address.

D: Transforming, by the sharing reading device, a position information address in the sharing address into the content position information. Step C may further include triggering, by the sharing reading device, an application program to parse the content position information. Further, in step C, the application program may position play the content corresponding to an access address of the shared content in the sharing address. Position play may refer to starting playback of content from an intermediate position, rather than from the beginning of the content.

Figure 7:
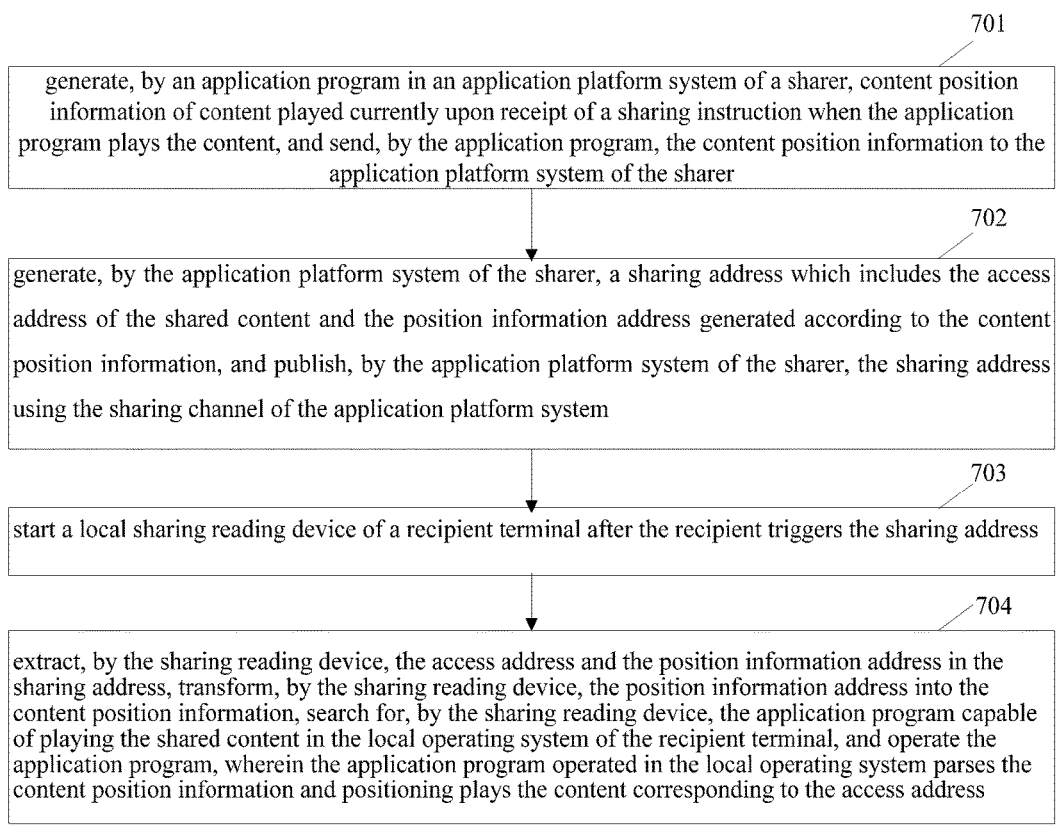
FIG. 7 is a flowchart of another example method for sharing content played by an application program.

FIG. 7 is a flowchart of a method for sharing content played by an application program. Referring to FIG. 7, the flow includes the following steps.

Step 701 may involve generating content position information of content currently being played by an application program in an application platform system of a sharer. The position information may be generated in response to receipt of a sharing instruction received when the application program is playing the content. Step 701 may further involve sending the content position information to the application platform system of the sharer.

Step 702 may include generating, by the application platform system of the sharer, a sharing address. The sharing address may include the access address of the shared content and the position information address generated according to the content position information. The application platform system of the sharer may further publish the sharing address using the sharing channel.

Step 703 may involve starting a local sharing reading device of a recipient terminal after the recipient triggers the sharing address.

Step 704 may involve extracting from the sharing address, the access address of the shared content and the position information address. The sharing reading device may perform the extraction. The sharing reading device may also transform the position information address into the content position information. The sharing reading device may further search for an application program capable of playing the shared content in the local operating system of the recipient terminal. The sharing reading device may also operate the application program. The application program operating in the local operating system may parse the content position information and position play the content corresponding to the access address.

The content played by the application program may be shared by the application platform system. Therefore, the sharer may operate the application platform system in a local terminal and operate the corresponding application program in the application platform system. The application platform system may be installed in the local terminal of the sharer or the recipient, and a user may directly login and use the application platform system. Alternatively, the application platform system may be operated on a web server. The user may have to login to the server via the local terminal connected to the internet to operate the application platform system. Generally, such an application platform system operated on the server is referred to as a web application platform system.

The recipient of the shared content may use the application program operated in the local operating system to play the shared content. The recipient may install and operate the application platform system locally. Alternatively, the recipient may not have to operate the application platform system locally. The sharing reading device may be a small program. The sharing reading device may be integrated in the application platform system. The sharing address may be associated with the instruction for starting the sharing reading device. In the case where the recipient installs and operates the application platform system, the application platform system may be triggered to start the sharing reading device after the recipient triggers (such as, by clicking) the sharing address. In another embodiment, the sharing reading device may be a plug-in stored at a server end. The download address of the sharing reading device may be associated with the sharing address. The sharing reading device may be triggered and downloaded to the local terminal of the recipient after the recipient triggers the sharing address, and the sharing reading device may be automatically installed and operated.

The sharing channel of the application platform system may be a network communication system having information interaction with the application platform system. The sharer may login to the application platform system and then login to the network communication system using the application platform system, to publish the sharing address of the played content by the network communication system. The network communication system may be an instant communication system, a mail system, a short message system, a blog system, a microblog system, a web log system, a network space system. The recipient of the shared content may be a user who has authority for interaction with the sharer in the network communication system. For example, the recipient for the shared content may be designated as a friend of the sharer in the network communication system and may have highest access authority, while another user may be designated as an acquaintance with a lower access authority. Other designations and access authorizations are possible and the above are just examples to illustrate the concept. The sharer and the recipient may communicate and interact on the network with each other by the network communication system.

The application platform system may provide several options to customize the sharing channel as per the sharer's preferences. For example, the sharer may customize publication of the sharing address using the particular sharing channel(s). For example, the sharer may select the instant communication system, or the mail system, or the short message system to send the sharing address to the recipient. The recipient may directly accesses the instant communication system, the mail system, or the short message system to open the message, the mail or the short message and click the sharing address and trigger and start the sharing reading device. Alternatively, the sharer may select the blog system or the microblog system to publish a blog including the sharing address. In this case, users of the blog or the microblog of the sharer may see and click the sharing address, to trigger and start the sharing reading device. Alternatively, or in addition, the sharer may select the web log system or the network space system to publish a log including the sharing address. All of the users who may login to the web log or the network space of the sharer may see and click the sharing address, to trigger and start the sharing reading device.

The application program of the sharer, which is playing content in Step 701, may be a content application program (i.e. an application program containing content). Alternatively, the application program may be a special play application program specialized to play content from a third party.

The content application program may contain the content to be played, such as a video file application program, an audio file application program, or an e-book application program. The video file application program may be provided with a video player to directly play the video content in the application program. The audio file application program may be provided with an audio player to directly play the audio content in the application program. The e-book application program may be provided with a reader to directly show the content in the e-book. The application programs may have specific content position information when playing content, such as, the playing progress of the video and the audio, or the page currently being read of the e-book. Other information regarding the progress of playing the content may also be recorded.

The play application program, on the other hand, may not contain the content to be displayed, but may be specialized to play a file from a third party. For example, the video play application program may play a video file, the audio play application program may play an audio file, and the e-book play application program (also known as e-reading application program) may play an e-book. Also, the play application programs may have specific content position information when playing content, such as, the playing progress of the video and the audio, or the page currently being read of the e-book. The content position may also be recorded in other forms such as the next page to be read, or the next frame in the video.

In the application platform system of the sharer, if it is desired to share the content to be displayed in the content application program, the content application program may be shared directly. Since the content to be displayed in the content application program and the application program are inseparable, the content may also be shared this way. Instead, if it is desired to share the content to be played by the play application program, an access address of the content to be played may be shared.

The recipient terminal may play the content being played in the application program of the sharer by using the application program in the local operating system of the recipient terminal. Thus, there may be at least two application programs involved—the application program of the sharer and the application program of the recipient. The application programs may be of the same type, or may be different application programs compatible to play the particular content type being shared. Therefore, with regard to the same content type, such as a video type, the different application programs may use the same format to express content position information. The format used may be a unified standard interface, which may be an industry standard. In this way, one application program may parse the position information generated by other application programs, as long as the position information refers to the same content type. For example for video content, the standard interface of the position information may use the following format.

```
{
    "type": "video",
    "video id": "id for uniquely identifying a video (the id is not the id of the application program per se) ",
        "name": "the name of the video",
        "author": "author",
        "season": "which season",
        "episode": "which episode",
        "seconds": "which second in the episode of the video"
}
```

Continuing the example for the video type content, the video type application programs may generate the position information by using the above-mentioned standard interface format. Therefore, one application program may be able to correctly interpret the position information generated by other different application programs.

The position information may include, for example, at least the following information.

With regard to an audio type application program, the position information may include an identification and name of the audio being currently played. Further description may include the season and episode number of the audio being played. The information may also include a reference to the playback position, such as which second in the episode of the audio file is currently being played. The current playback location may also be referred to in other ways, such as using a file pointer to indicate a location in the audio file where the application program is currently reading and playing the content from.

With regard to an e-book type application program, the position information may include a name of the book being currently read and which chapter and which section of the book is a reader currently reading. The position information may also include the face of the book and the total number of pages in the book and other bibliographic information. The position information may further include which page is being currently read.

Similarly, the position information of other content types may be generated and parsed by the application program.

The content position information may be expressed using standard formats such as JSON or XML for convenient expansion. Other formats may also be used.

The content position information may use a standard interface expressing format, and therefore, a industry standard may be formed and the content position information may be standardized. This may improve compatibility between the different application programs to share content and in turn may improve overall user experience.

Further embodiments of the method to share content are described below.

Fifth Embodiment

The application program in Step A may be a content application program. The access address of the shared content in Step B may be a download address of the content application program. The content position information may include a content type.

Step D may include transforming the position information address into the content position information. The sharing device may perform the transformation. The sharing device may also download the content application program from the download address. The sharing device may also have to search for the application program according to the content type of the shared content. The content type of the shared content may be obtained from the content position information. The sharing device may operate the application program to parse the content position information. The application program may then play the content application program according to the parsed position information.

In an example implementation of the fifth embodiment, the content shared by the sharer may be the content application program. In the fifth embodiment, the application program in Step 701 may be the content application program being shared, which may be operated by a play application program capable of playing contents of the same type. The access address of the shared content in Step 702 may be a download address of the content application program. The content position information may include content type. For example, the "type" in the above-mentioned standard interface may identify the content type, such as "video" may represent video type. Step 704 may include extraction of the download address and the position information address in the sharing address by the sharing reading device. The sharing device may further transform the position information address into the content position information. The sharing reading device, may then download the content application program from the download address to the local terminal of the recipient. This may involve determining the content type of the content application program according to the content position information. The expressing format of the content position information may be a standard format, enabling the sharing reading device to parse the content position information. Further, the sharing reading device may have to search for the application program capable of playing content of the content type in the sharing device. The sharing device may download and operate the compatible application program in a local operating system of the recipient terminal. The application program operated in the local operating system may parse the content position information further and position plays the content application program.

In the further description of the fifth embodiment, video content type is used as an example. It is assumed that the user A logs in to an application platform system and that user A has installed and uses a content application program X. The content application program X is a video type application program, in which video content is included. The application program X may be developed by the manufacturer C of the application platform system of user A. It is further assumed that the user B logs in to a corresponding application platform system and that user B has installed a video type play application program D. The video type play application program used by B in B's local operating system may be manufactured by D. The content application program X and the play application program D both may use the standard interface to generate a position information of the played content and parse the position information.

Figure 8:
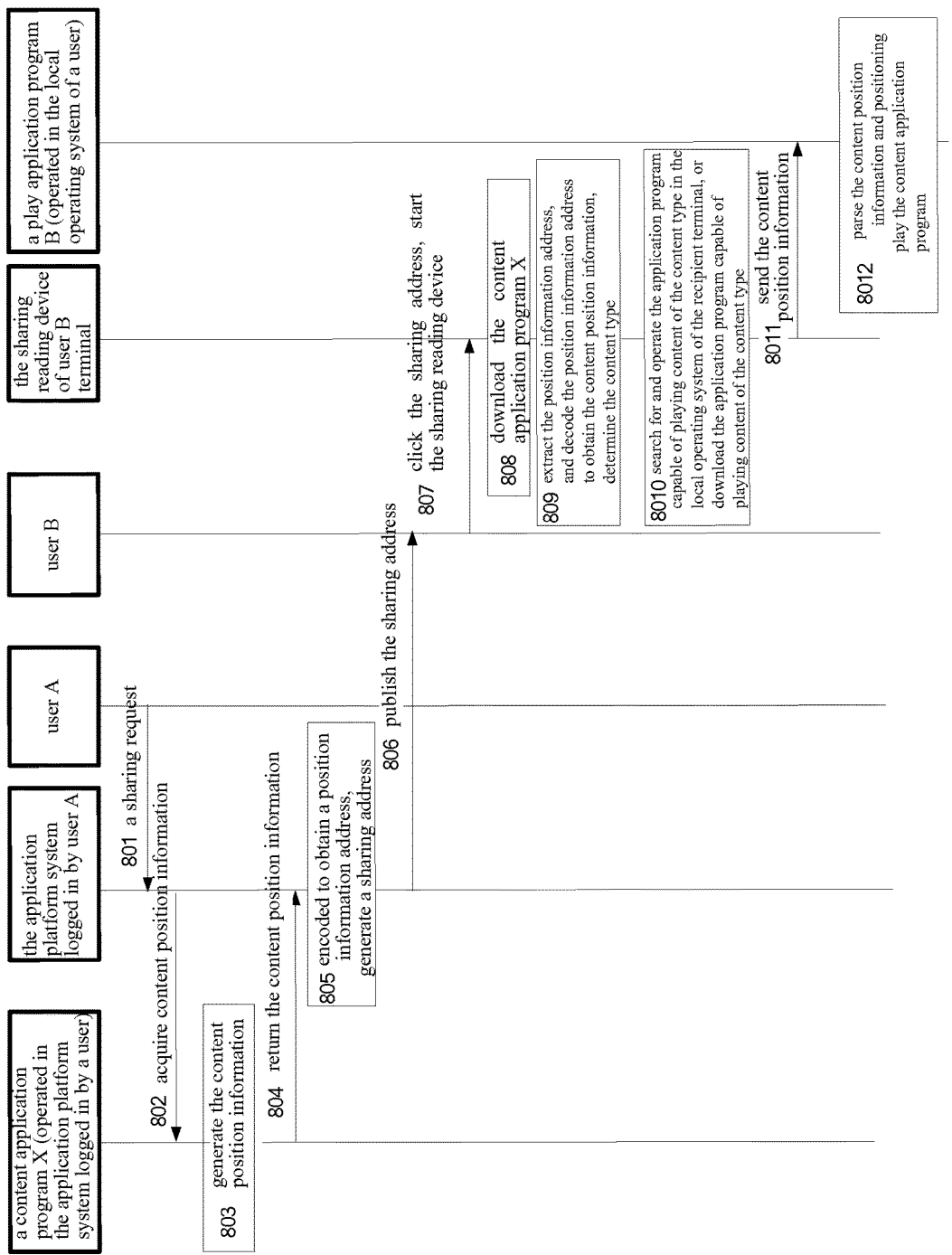
FIG. 8 is a flowchart of an example method for sharing content played by an application program according to a fifth embodiment.

FIG. 8 is a flowchart of an example method for sharing content played by an application program according to the fifth embodiment of the invention. In the flow, the user A shares the video content being played by the content application program X with the user B. The specific flow includes the following steps.

In Step 801, the user A may click a sharing button for sharing a certain content application program X when using the content application program X. The action may send a sharing request to the application platform system of user A. The sharing request may include the ID of the shared content application program X.

For example, the user A may be operating a certain video type application program. The user A may click the sharing button when the user A finds that a certain segment of content in the video type application program is worth sharing. The user A may click the sharing button to share the video type application program and the position of the segment of content.

In Step 802, the application platform system of user A may send a request for acquiring content position information to the content application program X identified by the ID in the sharing request.

In Step 803, the content application program X (i.e. the content application program X which the user A is using currently, that is to say, the content application program X operated in the application platform system of the user A) may generate the content position information. The content position information may be based on the current operating progress of the content application program X. For example, the playback progress for the video type application program at the time of receipt of the request for acquiring content position information may be utilized to generate the position information.

In Step 804, the content application program X may return the generated content position information to the application platform system.

In Step 805, the application platform system may perform an address encoding process (such as a base64 process) to obtain a position information address upon receiving the content position information. The application platform system may also determine the download address of the shared content application program X. The download address may be used as the access address of the shared content. The application platform system may combine the download address of the content application program X and the encoded position information address into a sharing address. If the length of the sharing address exceeds a predetermined length, an address shortening process may also be performed to compress the sharing address into a shorter address.

In Step 806, the application platform system may publish the sharing address by using a sharing channel (such as, an instant communication system, a mail system, a short message system, a log system, a space system, a blog system, a microblog system) of the application platform system. A user who has authority for interaction with the sharer in the sharing channel may see and click the sharing address. The sharing address may trigger and start the sharing reading device.

In Step 807, if a friend (i.e. a recipient, such as user B assumed herein) in the sharing channel of the user A clicks to trigger the sharing address after seeing the sharing address, the sharing reading device at the local terminal of the user B may be triggered and started after the sharing address is triggered.

Here, triggering and starting the sharing reading device may include at least the following steps. The sharing address may be associated with the download address of the sharing reading device. The application platform system may be triggered to start the sharing reading device integrated in the application platform system when the sharing address is clicked, in the case the local terminal of the user B is installed and operated with the application platform system. Alternatively, in the case where the local terminal of the user B is not installed and operated with the application platform system, the sharing reading device may be first downloaded to the local terminal of the user B after the sharing address is clicked. The sharing reading device may consequently be installed and operated to play the shared content.

In Step 808, the sharing reading device may extract the access address from the sharing address, which may be the download address of the content application program X. The sharing device may download the content application program X to the local operating system of the user B terminal from the download address.

In Step 809, the sharing reading device may extract a position information address from the sharing address, and transform the position information address into the content position information. The sharing reading device may decode by using a decoding technique corresponding to the encoding technique described earlier. The sharing reading device may further determine the type of the shared content according to the content type included in the content position information. The content position information may be in a standard format, and therefore the sharing reading device may parse the content position information to obtain the specific information therein. For example, the content type may be indicated as a video type.

In Step 8010, the sharing reading device may search and operate the application program capable of playing content of the content type in a local operating system of the recipient terminal. For example, the sharing reading device may start the play application program D installed in the local operating system by the user B, and send the local store address of the content application program X to the play application program D. The play application program D may, in turn play the content application program X.

Searching for and operating the application program capable of playing content of the content type in the local operating system of the recipient terminal may include at least the following steps performed by the sharing reading device.

Searching for the application program may be performed according to a preset white list of application programs capable to play the content type. The application programs which are installed and belong to the white list from the local operating system in the recipient terminal. An application program may be selected by default or an application program may be selected by a user from the found application programs. The application program may then be operated in the local operating system.

Alternatively, application programs associated with the extension name of the content type may be searched for in the local operating system. A particular application program, from those found, may be selected by default. In another example, an application program may be selected by a user from the read application programs. The selected application program may be installed and operated in the local operating system.

If the sharing reading device does not find the application program capable of playing the content type in the local operating system of the recipient terminal, the sharing reading device may further prompt the user whether to automatically install the application program supporting for this content type. If the user agrees, the sharing reading device may download the application program capable of playing the shared content at the recipient terminal. The sharing reading device may install and operates the application program in the local operating system. The application program operated in the local operating system may parse the content position information and position play the content corresponding to the access address. The download address of the play application program corresponding to each of the content type may be set in the sharing reading device, and the corresponding play application program may be downloaded from the download address.

In Step 8011, the sharing reading device may send the content position information to the found or downloaded play application program, such as the play application program D.

In Step 8012, the play application program D may parse the position information according to the standard interface format and position play the content application program X according to the parsed information. That is, the application program D may position play the video content in the content application program X, since the position information expresses the information by using the standard interface format.

For example, with regard to a video type content played by the shared content application program X, the play application program D may parse the position information to obtain the identification and name of the video being currently played currently. This may include which season and which episode the video belongs to. The information may further include the playback position in the video, such as the second in the episode being currently played. The playback by the play application program D may be directly positioned according to the information, and thus, the content may be played from the positioned based on the progress and shown to the user B.

The communication mode between the sharing reading device and the play application program D may use an interprocess communication mode, such as shared memory in the operating system or pipes.

Sixth Embodiment

The application program in Step A may be a play application program. The access address of the shared content in Step B may include a played content access address of the play application program. The played content access address may include a content type, or the content position information may include the content type.

Step D may include transforming, by the sharing reading device, the position information address into the content position information. Step D may further include searching for and operating, by the sharing reading device, the application program according to the content type in the played content access address or the content position information. The application program may be responsible to parse the content position information, and play the content corresponding to the played content access address according to the position information.

In Step D, the sharing reading device may further download and operate the application program to parse the content position information in the case where no application program is found by the sharing reading device according to the content type. The application program may also be operated to position play the content corresponding to the access address.

The searching for and operating the application program may include at least the following steps.

A preset white list of the application programs capable to play content of the content type, may be used to search the application program. The application programs, which are already installed on the local operating system of the recipient terminal, may belong to the white list. An application program from the list may be selected by default. Alternatively, an application program may be selected by a user from the found application programs. The application program may then be installed and operated in the local operating system.

Alternatively, application programs associated with the extension name of the content type may be read in the local operating system. An application program may be selected by default or by a user from the read application programs. The application program in the local operating system may then be operated.

In the sixth embodiment, the played content shared by the sharer may be the content application program.

In the sixth embodiment, the application program in Step 701 may be the play application program, and the content played by the play application program may have a special access address. The access address of the shared content in Step 702 may include the played content access address of the play application program. The played content access address may include the content type or the content position information may include the content type. For example, the "type" in the above-mentioned standard interface may be used to identify the content type, and "video" may represent video type. The access address may also include the extension name of video format such as "avi", "rmvb" to represent video type. Step 704 may include extracting, by the sharing reading device, the played content access address and the position information address in the sharing address, and transforming, by the sharing reading device, the position information address into the content application program. Step 704 may also include determining, by the sharing reading device, the content type of the played content according to the played content access address or the content position information. The expressing format of the content position information may be a standard format, and therefore the sharing reading device may parse the content position information to obtain the content. The position information may include the content type. the sharing reading device may search for and operate the application program capable of playing content of the content type in the local operating system of the recipient terminal. The application program operated in the local operating system may parse the content position information and play the content corresponding to the played content access address according to the position information.

In the following description of the sixth embodiment, the video type content is taken as an example. It is assumed that the user A installs and plays a play application program Y of the manufacturer C in the application platform system logged in by the user A. The content played by the play application program Y is video type content. It is also assumed that the user B installs a video type play application program D of the manufacturer D in the local operating system. The play application program Y and the application program D both may use the standard interface to generate a position information of the played content and parse the position information.

Figure 9:
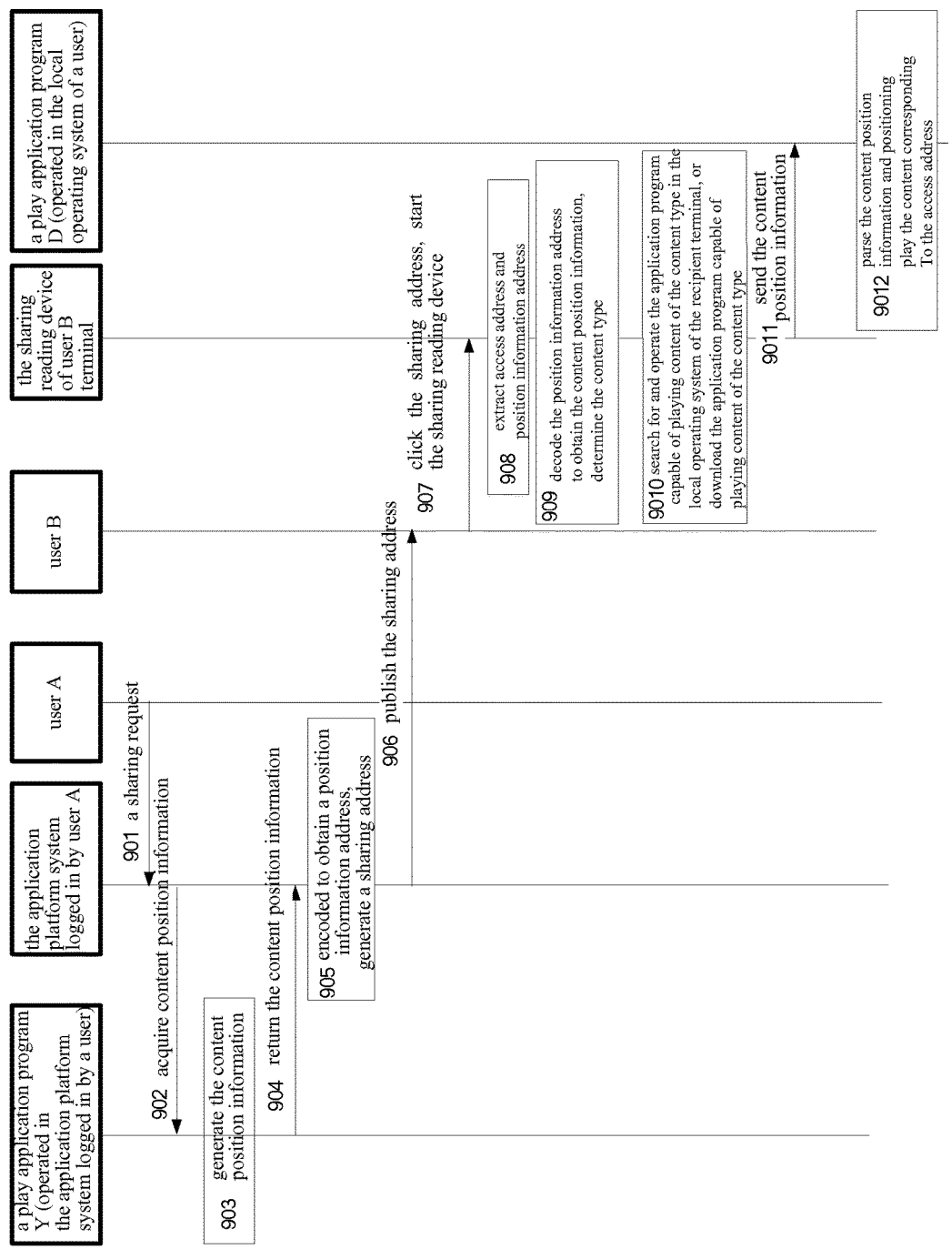
FIG. 9 is a flowchart of an example method for sharing content played by an application program according to a sixth embodiment.

FIG. 9 is a flowchart of an example method for sharing content played by an application program according to the sixth embodiment. In the flow, the user A shares the video content being played by the play application program Y with the user B. The specific flow includes the following steps.

In Step 901, the user A may click a sharing button for sharing a certain play application program Y to send a sharing request to the application platform system logged in by the user A. The sharing request may be sent when the user A is using the play application program Y in the logged application platform system. The sharing request may include the ID of the shared play application program Y.

For example, in the case where the user A operates a certain video type application program, the user A finds that a certain segment of content in the video type application program is relatively worth sharing. The user A may click the sharing button, in such a case, to share the video type application program and the position of the segment of content.

In Step 902, the application platform system logged in by the user A may send a request for acquiring content position information to the play application program Y identified by the ID in the sharing request.

In Step 903, the play application program Y (i.e. the play application program Y which the user A is using currently, that is to say, the play application program Y operated in the application platform system of the user A) may generate the content position information according to the current operating progress of the play application program Y (for example, the playback progress for the video type application program) upon receipt of the request for acquiring content position information.

In Step 904, the play application program Y may return the generated content position information to the application platform system.

In Step 905, the application platform system may perform an address encoding process (such as a base64 process) on the content position information to obtain a position information address upon receiving the content position information. The application platform system may determine the shared played content access address and take the played content access address as the access address of the shared content. The application platform may further combine the played content access address and the encoded position information address into a sharing address. If the length of the sharing address exceeds a predetermined length, an address shortening process may also be performed to compress the sharing address into a shorter address.

In Step 906, the application platform system may publish the sharing address by using the sharing channel (such as, an instant communication system, a mail system, a short message system, a log system, a space system, a blog system, a microblog system) of the application platform system. The sharing address may be associated with the download address of the sharing reading device. In this case, users who have authority for interaction with the sharer in the sharing channel may see and click the sharing address.

In Step 907, if a friend (i.e. a recipient, such as the user B assumed herein) in the application platform system of the user A clicks to trigger the sharing address after seeing the sharing address, the sharing reading device at the local terminal of the user B may be triggered and started after the sharing address is triggered.

Here, triggering and starting the sharing reading device include at least the following steps. The sharing address may be associated with the download address of the sharing reading device. The application platform system may be triggered the sharing reading device integrated in the application platform system may be started once after the sharing address is clicked. In this case the local terminal of the user B is installed and operated with the application platform system. In the case where the local terminal of the user B is not installed and operated with the application platform system, the sharing reading device may be downloaded from the download address of the sharing reading device to the local terminal of the user B after the sharing address is clicked. The sharing reading device may then be installed and operated.

In Step 908, the sharing reading device may extract the access address (namely, the played content access address) and the position information address in the sharing address.

In Step 909, the sharing reading device may decode the position information address for the content position information, and determine the type of the shared content according to the content type included in the content position information. The content position information may be expressed by using a standard interface, enabling the sharing reading device to parse the content position information to obtain the specific information. Alternatively, the sharing reading device may determine the type of the shared content according to the content type included in the played content access address, such as for example, the content type is a video type.

In Step 9010, the sharing reading device may search for and operate the application program capable of playing content of the content type in the local operating system of the recipient terminal. For example, the play application program D installed in the local operating system by the user B may be found, to play, by the play application program D, the play application program Y.

If the sharing reading device does not find the application program capable of playing content of the content type in the local operating system of the recipient terminal, the sharing reading device may further prompt the user whether to automatically install the application program supporting the content type. If the user agrees, the sharing reading device may download the application program capable of playing the shared content to the recipient terminal and may then install and operate the application program in the local operating system. The application program operated in the local operating system may parse the content position information and plays the content corresponding to the access address based on the parsed content position information. The download address of the play application program corresponding to the content type may be set in the sharing reading device, and the corresponding play application program may be downloaded from the download address.

In Step 9011, the sharing reading device may send the content position information to the found or downloaded play application program, such as the play application program D in the above example.

In Step 9012, the play application program B may parse the position information according to a standard interface format and play the content corresponding to the played content access address according to the parsed information. That is, the video content in the play application program Y, may be position played based on the playback position expressed in the position information using the standard interface format.

For example, with regard to a video type content played by the shared play application program Y, the play application program D may parse the position information to obtain the identification and name of the video played currently. The identification may include information such as season and episode to which the video being played is a part of. The position information may also include playback position such as which second in the episode the video playback has to start from. The playback progress of the video content may be directly positioned according to the information, and the currently played content may be positioned based on the playback progress and shown to the user B.

A system for sharing content played by an application program, may execute the above-mentioned method. The sharing system may include an application platform system, a sharing reading device, a sharing interface in the application program operated based on the application platform system and a positioning playing interface in the application program operated based on the operating system.

The sharing interface in the application program may generate content position information of content currently being played in response to receipt of a sharing instruction when the application program plays the content. The content position information of the content currently being played may be sent to a local application platform system.

The application platform system may include a sharing triggering module and a sharing publishing module.

The sharing triggering module may receive a sharing instruction for the content played by the application program, and notify the sharing interface in the application program of the sharing instruction. The sharing triggering module may also receive the content position information returned by the sharing interface.

The sharing publishing module may generate a sharing address according to the content position information and publish the sharing address.

The sharing reading device is started upon receipt of a triggering for the sharing address. The sharing reading device may include a sharing receiving module and a program starting module.

The sharing receiving module may transform a position information address in the sharing address into the content position information.

The program starting module may trigger the application program and send the content position information. Alternatively, the program starting module may send the content position information and an access address of the shared content in the sharing address to the positioning playing interface in the application program.

The positioning playing interface in the application program may receive the content position information or the content position information and the access address of the shared content sent by the sharing reading device, and parses the content position information from such received information. The positioning playing interface may then play the shared content based on the parsed position information.

In another embodiment, the application program to which the sharing interface belongs may be a content application program, and the access address of the shared content may be a download address of the content application program.

The program starting module may download the content application program from the download address, and search for and operate the application program according to the content type in the content position information. The program starting module may further send the content position information to the positioning playing interface in the application program. The positioning playing interface, may in turn, parse the content position information and play the content application program according to the parsed playback position included in the position information.

In yet another embodiment, the application program to which the sharing interface belongs may be a play application program, and the access address of the shared content may be a played content access address of the play application program.

The program starting module may search for and operate the application program according to the content type in the played content access address or the content position information. The program starting module may then send the content position information and the played content access address to the positioning playing interface in the application program. The positioning playing interface may then parse the content position information and play the content corresponding to the played content access address according to the position of the playback control included in the parsed content position information.

In still another embodiment, the program starting module may download and operate the application program in the case where no application program is found by the program starting module according to the content type. In this case, the program starting module may send the content position information or the content position information and an access address of the shared content to the positioning playing interface in the application program. The positioning playing interface may parse the content position information and perform a positional play of the content corresponding to the access address based on a playback control position parsed from the content position information.

Another example of an application platform system may also be possible based on this disclosure. The application platform system may include a sharing triggering module and a sharing publishing module.

The sharing triggering module may receive a sharing instruction for content played by an application program, and notify a sharing interface in the application program about the sharing instruction. The sharing triggering module may also receive content position information returned by the sharing interface.

The sharing publishing module may generate a sharing address according to the content position information and publish the sharing address, in which the sharing address may trigger to start a sharing reading device.

A sharing reading device, in which the sharing reading device is started after a sharing address is triggered is described further.

The sharing reading device may include a sharing receiving module and a program starting module.

The sharing receiving module may transform a position information address in the sharing address into the content position information.

The program starting module may trigger the application program and send the content position information to the positioning playing interface in the sharing address. Alternatively, the content position information and an access address of the shared content may be sent in the sharing address to the positioning playing interface in the application program.

In one embodiment, the access address of the shared content is a download address of the content application program.

The program starting module may download the content application program from the download address. The program starting module may then search for and operate the application program according to the content type in the content position information to play the content application program. The program starting module may also send the content position information to the application program, to play the content application program according to the content position information.

In another embodiment, the access address of the shared content may be a played content access address of the play application program.

The program starting module may search for and operate the application program according to the content type in the played content access address or the content position information. The program starting module may then send the content position information and the played content access address to the application program, to play the content corresponding to the played content access address according to the parsed content position information.

In yet another embodiment, the program starting module may further download and operate the application program in the case where no application program is found by the program starting module according to the content type. The program starting module may send the content position information or the content position information and an access address of the shared content to the application program, to play the shared content according to the parsed content position information.

Figure 10:
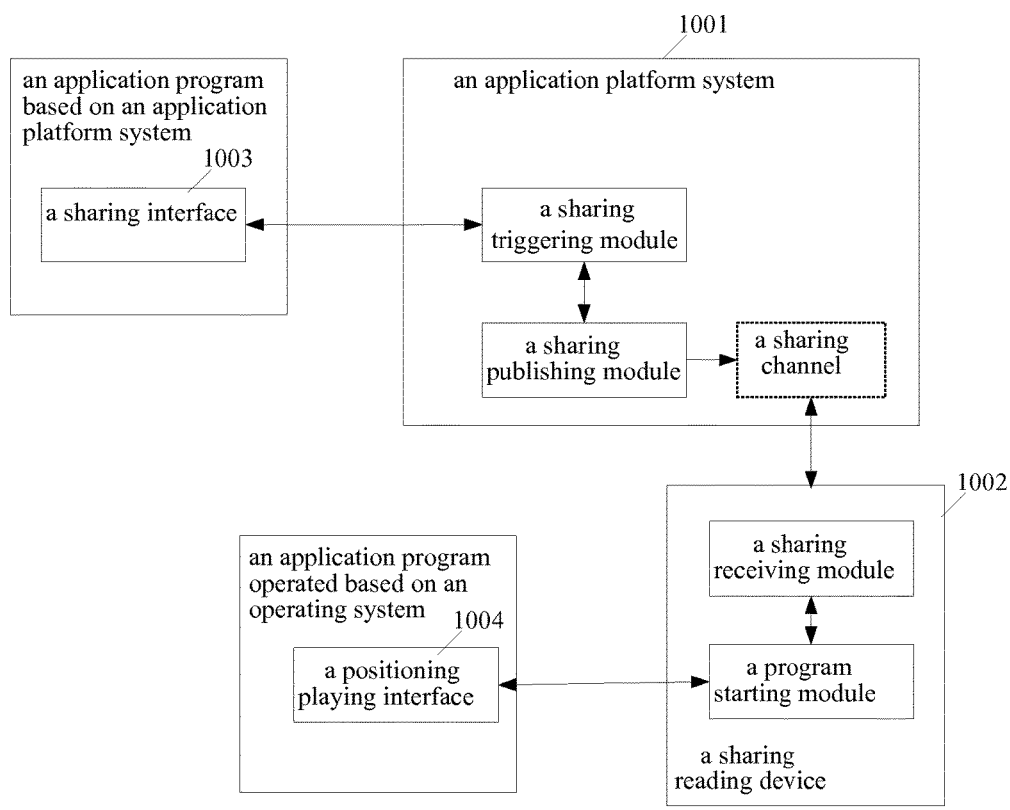
FIG. 10 is a schematic diagram of an example system for sharing content played by an application program.

FIG. 10 is another schematic composition diagram of an example system for sharing content played by an application program. Referring to FIG. 10, the sharing system may include an application platform system 1001, a sharing reading device 1002, a sharing interface 1003 in the application program operated based on the application platform system and a positioning playing interface 1004 in the application program operated based on an operating system.

The sharing interface 1003 in the application program may generate content position information of content currently being played by a sharer, using the application program to play the content. The sharing interface 1003 may generate the content position information in response to receipt of a sharing instruction and send the content position information to a local application platform system 1001.

The application platform system 1001 may include a sharing triggering module and a sharing publishing module.

The sharing triggering module may receive a sharing instruction for the content played by the application program. The sharing triggering module may notify the sharing interface 1003 of the sharing instruction to. The sharing triggering module may also receive the content position information returned by the sharing interface 1003.

The sharing publishing module may encode the content position information into position information address. The sharing publishing module may generate a sharing address including the position information address and an access address of the shared content. The sharing publishing module may further publish the sharing address using a sharing channel of the application platform system 1001. The sharing address may be triggered to start the sharing reading device 1002.

The sharing reading device 1002 may be started after the recipient triggers (such as by clicking) the sharing address. The sharing reading device 1002 may include a sharing receiving module and a program starting module.

The sharing receiving module may extract the access address of the shared content. The sharing receiving module may also extract the position information address in the sharing address and transform a position information address in the sharing address into the content position information.

The program starting module may trigger the application program in the local operation system of the receiver terminal. The program starting module may also send the content position information to the positioning playing interface in the application program. The program starting module may alternatively send the content position information and an access address of the shared content to the positioning playing interface in the application program.

The positioning playing interface 1004 in the application program may receive the content position information or the content position information and the access address of the shared content sent by the sharing reading device 1002. The positioning playing interface may parse the content position information and position play the shared content. Position playing may refer to starting playback of the content from an intermediate position indicated in the content position information instead of a starting position of the shared content. For example, playback of a video may be started from $50^{th}$ second instead of from the $0^{th}$ (zeroth) second. Alternatively, in case of an e-book, the content may be viewed directly from the $50^{th}$ page instead of the $1^{st}$ page. The intermediate position from which the playback may be started from may be included in the content position information. The intermediate playback position may represent the portion of the content that the sharer may have found interesting and worth sharing with the other users.

In an embodiment, the application program to which the sharing interface 1003 belongs may be a content application program, and the access address of the shared content may be a download address of the content application program. The program starting module in the sharing reading device may download the content application program from the download address, and determine the content type of the content application program. The program starting module may also search for an application program capable of playing content of the content type in the local operating system of the recipient terminal. The program starting module may start the application program, and send the content position information to the positioning playing interface in the application program. The positioning playing interface may parse the content position information, and position plays the content application program according to the playback position included in the parsed content position information.

In another embodiment, the application program to which the sharing interface 1003 belongs may be a play application program, and the access address of the shared content may be a played content access address of the play application program. The program starting module may determine the content type of the played content, and search for and operate the application program capable of playing content of the content type in the local operating system of the recipient terminal. The program starting module may send the content position information and the played content access address to the positioning playing interface in the application program. The positioning playing interface may parse the content position information, and position play the content corresponding to the played content access address based on the playback position indicated by the parsed content position information.

The program starting module in the sharing reading device may also download an application program capable of playing the shared content to a recipient terminal and install and operate the application program in a local operating system in the case an application program capable of playing the shared content is not found in the local operating system of the recipient terminal. The program starting module may further send the content position information or the content position information and an access address of the shared content to the positioning playing interface in the downloaded application program. The positioning playing interface may parse the content position information, to play the content corresponding to the access address according to the playback position in the content position information.

It should be understood by those skilled in the art that, all or part of the steps of the above embodiments may be implemented by hardware, and may also be implemented by virtual hardware instructed by a program. The program may be stored in a nonvolatile computer-readable storage medium, and the storage medium may be, for example, a read-only memory, a magnetic disk or an optical disc.

What is described above are only specific embodiments and is not intended to limit the present disclosure. Any change, equivalent substitution and improvement made within the spirit and principle of the present invention all fall within the scope of protection of the present disclosure. The foregoing detailed description has described only a few of the many possible implementations of the present disclosure. For this reason, this description of example embodiments is intended by way of illustration, and not by way of limitation. The methods, devices, and logic described above may be implemented in many different ways in many different combinations of hardware, software or both hardware and software.

What is claimed is:

1. A method for sharing content played by an application program, comprising:
  A: generating, by an application program in an application platform system of a sharer, content position information of content played currently upon receipt of a sharing instruction when the application program plays the content, and sending, by the application program, the content position information of the content played currently to the application platform system of the sharer, wherein the content position information is generated according to a current operating progress of the application program;
  B: generating a sharing address according to the content position information and publishing the sharing address, by the application platform system of the sharer; and
  C: transforming, by an application platform system of a recipient, a position information address in the sharing address into the content position information upon receipt of triggering for the sharing address, and triggering, by the application platform system of the recipient, an application program to parse the content position information, to positioning play the content corresponding to an access address in the sharing address.

2. The method according to claim 1, wherein the application program in Step A is a content application program; the access address of the shared content in Step B is a download address of the content application program; and
  Step C comprises: transforming, by the application platform system of the recipient, the position information address into the content position information upon receipt of the triggering for the sharing address, downloading, by the application platform system of the recipient, the content application program from the download address and operating, by the application platform system of the recipient, the content application program to parse the content position information, to positioning play the content in the content application program.

3. The method according to claim 1, wherein the application program in Step A is a play application program; the access address of the shared content in Step B comprises a download address and a played content access address of the play application program; and
  Step C comprises: transforming, by the application platform system of the recipient, the position information address into the content position information upon receipt of the triggering for the sharing address, downloading, by the application platform system of the recipient, the play application program from the download address and operating, by the application platform system of the recipient, the play application program to parse the content position information, to positioning play the content corresponding to the played content access address.

4. The method according to claim 1, wherein a default application program for playing a particular type of content is provided in the application platform system;
the application program in Step A is a content application program, the content position information comprises a content type; the access address of the shared content in Step B is a download address of the content application program; and
Step C comprises: downloading, by the application platform system of the recipient, the content application program from the download address upon receipt of the triggering for the sharing address, transforming, by the application platform system of the recipient, the position information address into the content position information, and operating, by the application platform system of the recipient, the default application program according to the content type in the content position information to parse the content position information, to positioning play the content application program.

5. The method according to claim 1, wherein a default application program for playing a particular type of content is provided in the application platform system;
the application program in Step A is a play application program; the access address of the shared content in Step B comprises a played content access address of the play application program; the played content access address comprises a content type, or the content position information comprises a content type; and
Step C comprises: transforming, by the application platform system of the recipient, the position information address into the content position information upon receipt of the triggering for the sharing address, and operating, by the application platform system of the recipient, the default application program according to the content type in the played content access address or the content position information to parse the content position information, to positioning play the content corresponding to the played content access address.

6. A system for sharing content played by an application program, comprising an application platform system, a sharing interface and a positioning playing interface in the application program, wherein the application program is operated based on the application platform system;
the sharing interface in the application program is adapted to generate content position information of content played currently upon receipt of a sharing instruction when the application program plays the content, and send the content position information of the content played currently to a local application platform system, wherein the content position information is generated according to a current operating progress of the application program;
the application platform system comprises a sharing triggering module, a sharing publishing module and a sharing receiving module,
wherein the sharing triggering module is adapted to receive a sharing instruction for the content played by the application program, notify the sharing instruction to the sharing interface in the application program, and receive the content position information returned by the sharing interface;

the sharing publishing module is adapted to generate a sharing address according to the content position information and publish the sharing address; and
the sharing receiving module is adapted to transform a position information address in the sharing address into the content position information upon receipt of the triggering for the sharing address, and trigger the application program to send the content position information or send the content position information and an access address of the shared content in the sharing address to the positioning playing interface in the application program; and
the positioning playing interface in the application program is adapted to receive the content position information or the content position information and the access address of the shared content sent by the application platform system and parse the content position information, to positioning play the shared content.

7. The system according to claim 6, wherein the application program to which the sharing interface belongs is a content application program, and the access address of the shared content is a download address of the content application program; and
the sharing receiving module is specifically adapted to transform the position information address into the content position information upon receipt of the triggering for the sharing address, download the content application program from the download address and operate the content application program, and send the content position information to the positioning playing interface in the content application program; or, download the content application program from the download address, operate a default application program according to a content type in the content position information, and send the content position information to the positioning playing interface in the default application program; and
the positioning playing interface parses the content position information, to positioning play the content application program.

8. The system according to claim 6, wherein the application program to which the sharing interface belongs is a play application program, and the access address of the shared content comprises a download address and a played content access address of the play application program;
the sharing receiving module is specifically adapted to transform the position information address into the content position information upon receipt of the triggering for the sharing address, download the play application program from the download address and operate the play application program, and send the content position information and the played content access address to the positioning playing interface in the play application program; and
the positioning playing interface parses the content position information, to positioning play the content corresponding to the played content access address.

9. The system according to claim 6, wherein the application program to which the sharing interface belongs is a play application program, and the access address of the shared content is a played content access address of the play application program;
the sharing receiving module is specifically adapted to transform the position information address into the content position information upon receipt of the triggering for the sharing address, operate a default application program according to a content type in the played content access address or the content position information, and send the content position information and the played content access address to the positioning playing interface in the default application program; and the positioning playing interface parses the content position information, to positioning play the content corresponding to the played content access address.

10. A method for sharing content played by an application program, comprising:
   A: generating, by an application program in an application platform system of a sharer, content position information of content played currently upon receipt of a sharing instruction when the application program plays the content, and sending, by the application program, the content position information of the content played currently to the application platform system of the sharer, wherein the content position information is generated according to a current operating progress of the application program;
   B: generating a sharing address according to the content position information and publishing the sharing address, by the application platform system of the sharer;
   C: starting a local sharing reading device of a recipient terminal, upon receipt of a triggering for the sharing address; and
   D: transforming, by the sharing reading device, a position information address in the sharing address into the content position information, and triggering, by the sharing reading device, an application program to parse the content position information, to positioning play the content corresponding to an access address of the shared content in the sharing address.

11. The method according to claim 10, wherein the application program in Step A is a content application program; the access address of the shared content in Step B is a download address of the content application program; the content position information comprises a content type; and
   Step D comprises: transforming, by the sharing reading device, the position information address into the content position information, downloading, by the sharing reading device, the content application program from the download address, searching for and operating, by the sharing reading device, the application program according to the content type in the content position information to parse the content position information, to positioning play the content application program.

12. The method according to claim 10, wherein the application program in Step A is a play application program; the access address of the shared content in Step B comprises a played content access address of the play application program; the played content access address comprises a content type, or the content position information comprises the content type; and
   Step D comprises: transforming, by the sharing reading device, the position information address into the content position information, searching for and operating, by the sharing reading device, the application program according to the content type in the played content access address or the content position information to parse the content position information, to positioning play the content corresponding to the played content access address.

13. A system for sharing content played by an application program, comprising an application platform system, a sharing reading device, a sharing interface in the application program operated based on the application platform system and a positioning playing interface in the application program operated based on an operating system,
   wherein the sharing interface in the application program is adapted to generate content position information of content played currently upon receipt of a sharing instruction when the application program plays the content, and send the content position information of the content played currently to a local application platform system, wherein the content position information is generated according to a current operating progress of the application program;
   the application platform system comprises a sharing triggering module and a sharing publishing module,
   wherein the sharing triggering module is adapted to receive a sharing instruction for the content played by the application program, notify the sharing instruction to the sharing interface in the application program and receive the content position information returned by the sharing interface; and
   the sharing publishing module is adapted to generate a sharing address according to the content position information and publish the sharing address;
   the sharing reading device is started upon receipt of a triggering for the sharing address, wherein the sharing reading device comprises a sharing receiving module and a program starting module;
   wherein the sharing receiving module is adapted to transform a position information address in the sharing address into the content position information; and
   the program starting module is adapted to trigger the application program and send the content position information or the content position information and an access address of the shared content in the sharing address to the positioning playing interface in the application program; and
   the positioning playing interface in the application program is adapted to receive the content position information or the content position information and the access address of the shared content sent by the sharing reading device and parse the content position information, to positioning play the shared content.

14. The system according to claim 13, wherein the application program to which the sharing interface belongs is a content application program, and the access address of the shared content is a download address of the content application program; and
   the program starting module is specifically adapted to download the content application program from the download address, search for and operate the application program according to a content type in the content position information, and send the content position information to the positioning playing interface in the application program; and
   the positioning playing interface parses the content position information, to positioning play the content application program.

15. An application platform system, comprising a sharing triggering module and a sharing publishing module,
   wherein the sharing triggering module is adapted to receive a sharing instruction for content played by an application program, notify the sharing instruction to a sharing interface in the application program, and receive content position information returned by the sharing interface, wherein the content position information is generated according to a current operating progress of the application program; and the sharing publishing module is adapted to generate a sharing address according to the content position information and publish the sharing address, wherein the sharing address can trigger to start a sharing reading device.

16. A sharing reading device, wherein the sharing reading device is started after a sharing address is triggered;

the sharing reading device comprises a sharing receiving module and a program starting module, the sharing receiving module is adapted to transform a position information address in the sharing address into the content position information, wherein the content position information is originally generated according to a current operating progress of the application program; and the program starting module is adapted to trigger the application program and send the content position information or the content position information and an access address of the shared content in the sharing address to the positioning playing interface in the application program.

* * * * *